US012757161B2

(12) United States Patent
Catovic et al.

(10) Patent No.: US 12,757,161 B2
(45) Date of Patent: Oct. 6, 2026

(54) SERVICE-BASED PAGING TECHNIQUES

(71) Applicant: QUALCOMM Incorporated, San Diego, CA (US)

(72) Inventors: Amer Catovic, San Diego, CA (US); Juan Zhang, Beijing (CN); Prasad Reddy Kadiri, San Diego, CA (US); Miguel Griot, La Jolla, CA (US); Haris Zisimopoulos, London (GB); Lenaig Genevieve Chaponniere, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/945,983

(22) Filed: Sep. 15, 2022

(65) Prior Publication Data

US 2023/0018140 A1 Jan. 19, 2023

Related U.S. Application Data

(63) Continuation of application No. PCT/CN2021/086801, filed on Apr. 13, 2021.

(51) Int. Cl.
*H04W 4/00* (2018.01)
*H04W 68/00* (2009.01)

(52) U.S. Cl.
CPC .................................. *H04W 68/00* (2013.01)

(58) Field of Classification Search
CPC .... H04W 68/00; H04W 68/005; H04W 88/06
See application file for complete search history.

(56) References Cited

U.S. PATENT DOCUMENTS

2004/0180675 A1* 9/2004 Choi ..................... H04L 65/611 455/458
2004/0248573 A1* 12/2004 Wandel ................. H04W 28/18 455/435.1
2017/0048737 A1* 2/2017 Pao ......................... H04L 5/006

(Continued)

FOREIGN PATENT DOCUMENTS

CN 101895986 A 11/2010
CN 112616185 A 4/2021

(Continued)

OTHER PUBLICATIONS

International Search Report and Written Opinion—PCT/CN2021/086801—ISA/EPO—Jan. 13, 2022.

(Continued)

*Primary Examiner* — Omoniyi Obayanju
(74) *Attorney, Agent, or Firm* — Holland & Hart LLP

(57) ABSTRACT

Methods, systems, and devices for wireless communications are described in which paging messages may provide an indication of a service that caused the page, and a receiving user equipment (UE) may determine a paging response based on a UE status and the service that caused the page. The paging response may include ignoring the page, a paging response with a busy indication, or a paging response after a time delay, for example. The paging message may be received at an access stratum (AS) layer of the UE, and the AS layer may provide the paging message to a non-access stratum (NAS) layer along with the indication of the service that caused the page. The NAS layer may determine the paging response.

26 Claims, 18 Drawing Sheets

(56) References Cited

U.S. PATENT DOCUMENTS

| | | | |
|---|---|---|---|
| 2018/0213556 A1 | 7/2018 | Rico Alvarino et al. | |
| 2018/0227812 A1* | 8/2018 | Nagasaka | H04W 24/10 |
| 2018/0324751 A1 | 11/2018 | Hampel et al. | |
| 2020/0351818 A1 | 11/2020 | Park et al. | |
| 2021/0105866 A1 | 4/2021 | Kavuri et al. | |
| 2022/0116909 A1* | 4/2022 | Jung | H04W 74/0833 |
| 2022/0191778 A1* | 6/2022 | Kumar | H04W 36/142 |
| 2022/0217675 A1* | 7/2022 | Chen | H04W 68/00 |
| 2023/0388967 A1* | 11/2023 | Chang | H04W 76/11 |

FOREIGN PATENT DOCUMENTS

| | | | | |
|---|---|---|---|---|
| KR | 661706 B1 * | 12/2006 | H04B 7/2612 |
| WO | WO-2018005419 A1 | 1/2018 | |
| WO | WO-2018161244 A1 | 9/2018 | |
| WO | WO2020185949 A2 | 9/2020 | |
| WO | WO2020209620 A1 | 10/2020 | |
| WO | WO-2021015502 A1 | 1/2021 | |
| WO | WO-2021066562 A1 | 4/2021 | |

OTHER PUBLICATIONS

OPPO: "KI#1, Update of Paging Cause Solution and Conclusion Proposal", 3GPP SA WG2 Meeting #141E, S2-2006998, Oct. 12, 2020-Oct. 23, 2020, pp. 1-2, Oct. 23, 2020 (Oct. 23, 2020) the whole document.

3GPP TS 23.401: "3rd Generation Partnership Project, Technical Specification Group Services and System Aspects, General Packet Radio Service (GPRS) Enhancements for Evolved Universal Terrestrial Radio Access Network (E-UTRAN) Access (Release 17)", 3GPP Standard, 3GPP TS 23.401, 3rd Generation Partnership Project, Mobile Competence Centre, 650, Route Des Lucioles, F-06921 Sophia-Antipolis Cedex, France, vol. SA WG2, No. V17.0.0, Mar. 30, 2021, XP052000154, pp. 1-442, paragraph [4.3.27], paragraph [5.3.4].

3GPP TS 24.301: "3rd Generation Partnership Project, Technical Specification Group Core Network and Terminals, Non-Access-Stratum (NAS) Protocol for Evolved Packet System (EPS), Stage 3 (Release 17)", 3GPP Standard, Technical Specification, 3GPP TS 24.301, 3rd Generation Partnership Project, Mobile Competence Centre, 650, Route Des Lucioles, F-06921 Sophia-Antipolis Cedex, France, vol. CT WG1, No. V17.1.0, Dec. 18, 2020, XP051975211, pp. 1-587, paragraph [05.6].

3GPP TS 36.300: "3rd Generation Partnership Project, Technical Specification Group Radio Access Network, Evolved Universal Terrestrial Radio Access (E-UTRA) and Evolved Universal Terrestrial Radio Access Network (E-UTRAN), Overall Description, Stage 2 (Release 16)", 3GPP TS 36.300, 3rd Generation Partnership Project, Mobile Competence Centre, 650, Route Des Lucioles, F-06921 Sophia-Antipolis Cedex, France, vol. RAN WG2, No. V16.5.0, Mar. 29, 2021, XP052000108, pp. 1-391, par [10.1.4], par [19.2.1.1], par [19.2.2.1], par [23.13].

Supplementary European Search Report—EP21936344—Search Authority—Munich—Nov. 26, 2024.

* cited by examiner

SERVICE-BASED PAGING TECHNIQUES

CROSS REFERENCE

The present Application for Patent is a Continuation of Chinese PCT Patent Application No. PCT/CN2021/086801 by CATOVIC et al., entitled "SERVICE-BASED PAGING TECHNIQUES," filed Apr. 13, 2021, assigned to the assignee hereof, and expressly incorporated by reference in its entirety herein.

FIELD OF TECHNOLOGY

The following relates to wireless communications, including service-based paging techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a base station may transmit a paging message to a UE to initiate communications for a particular service. For example, if a voice call is to be completed with the UE, the base station may transmit a paging message to the UE. The paging message may trigger a UE paging response message, which may result in a signaling exchange to complete establishment of the voice call. Other services may trigger a paging message to the UE in a similar manner, and the UE transmits the paging response according to an established response timeline. Efficient techniques to provide responses to a paging message may help to enhance UE and network efficiency.

SUMMARY

The described techniques relate to improved methods, systems, devices, and apparatuses that support service-based paging techniques. In accordance with various aspects, paging messages may provide an indication of a service that caused the page, and a receiving user equipment (UE) may determine a paging response based on a UE status and the service that caused the page. In some cases, the UE be a multiple universal subscriber identity module (MUSIM) device, and may have an active connection on a first USIM, where a paging response on a second USIM may cause an interruption in the active connection. In such cases, the UE may elect to ignore the page, or may transmit a paging response with a busy indication. In other cases, the page may be associated with a multicast service that transmits paging messages to multiple UEs at once, and the receiving UE may transmit a paging response after a delay (e.g., a random delay period) in order to avoid congestion associated with multiple UEs transmitting a paging response using a same set of resources.

In some cases, the paging message may be received at an access stratum (AS) layer of the UE, and the AS layer may provide the paging message to a non-access stratum (NAS) layer along with the indication of the service that caused the page. The NAS layer may then determine the paging response. In some cases, the paging response may include ignoring the paging message, responding to the paging message according to a baseline paging response, responding to the paging message with a busy indication, or responding to the paging message after an expiration of a delay time period.

A method for wireless communications at a user equipment (UE) is described. The method may include receiving, at an access stratum layer of the UE, a paging message from a base station, the paging message including an indication of a service that caused the paging message, providing the paging message, including the indication of the service that caused the paging message, to a non-access stratum layer of the UE, and responding to the paging message based on a determination at the non-access stratum layer of a paging response, the paging response based on the indication of the service and one or more parameters of the UE.

An apparatus for wireless communications at a UE is described. The apparatus may include a processor, memory coupled with the processor, and instructions stored in the memory. The instructions may be executable by the processor to cause the apparatus to receive, at an access stratum layer of the UE, a paging message from a base station, the paging message including an indication of a service that caused the paging message, provide the paging message, including the indication of the service that caused the paging message, to a non-access stratum layer of the UE, and respond to the paging message based on a determination at the non-access stratum layer of a paging response, the paging response based on the indication of the service and one or more parameters of the UE.

Another apparatus for wireless communications at a UE is described. The apparatus may include means for receiving, at an access stratum layer of the UE, a paging message from a base station, the paging message including an indication of a service that caused the paging message, means for providing the paging message, including the indication of the service that caused the paging message, to a non-access stratum layer of the UE, and means for responding to the paging message based on a determination at the non-access stratum layer of a paging response, the paging response based on the indication of the service and one or more parameters of the UE.

A non-transitory computer-readable medium storing code for wireless communications at a UE is described. The code may include instructions executable by a processor to receive, at an access stratum layer of the UE, a paging message from a base station, the paging message including an indication of a service that caused the paging message, provide the paging message, including the indication of the service that caused the paging message, to a non-access stratum layer of the UE, and respond to the paging message based on a determination at the non-access stratum layer of a paging response, the paging response based on the indication of the service and one or more parameters of the UE.

In some examples of the method, apparatuses, and non-transitory computer-readable medium described herein, the paging response may be determined based on one or more of a type or capability of the UE, a multiple universal subscriber identity module (MUSIM) status of the UE, an idle or active state of the UE, a user preference provided to the UE, a network configuration of the UE, a data network name (DNN) or network slice associated with the paging message, or any combinations thereof. In some examples of the method, apparatuses, and non-transitory computer-readable medium described herein, the paging response includes ignoring the paging message, responding to the paging message according to a baseline paging response, responding to the paging message with a busy indication, or responding to the paging message after an expiration of a delay time period.

In some examples of the method, apparatuses, and non-transitory computer-readable medium described herein, the paging message includes an explicit indication of the service that caused the paging message. Some examples of the method, apparatuses, and non-transitory computer-readable medium described herein may further include operations, features, means, or instructions for determining, based on an identification associated with the paging message, the service that caused the paging message.

Some examples of the method, apparatuses, and non-transitory computer-readable medium described herein may further include operations, features, means, or instructions for determining, based on a parameter included in the paging message, the service that caused the paging message. In some examples of the method, apparatuses, and non-transitory computer-readable medium described herein, the parameter included in the paging message may be an identity associated with the service.

Some examples of the method, apparatuses, and non-transitory computer-readable medium described herein may further include operations, features, means, or instructions for receiving, from a user, one or more preferences for responding to paging messages associated with one or more services, and where the determination at the non-access stratum layer of the paging response may be based on the one or more preferences.

Some examples of the method, apparatuses, and non-transitory computer-readable medium described herein may further include operations, features, means, or instructions for determining a random response time for transmitting a response to the paging message based on a preconfigured maximum paging response time or a configuration provided in non-access stratum signaling, starting a timer with a duration of the random response time, and transmitting the paging response upon expiry of the timer. In some examples of the method, apparatuses, and non-transitory computer-readable medium described herein, the UE includes a first universal subscriber identity module (USIM) and a second USIM, and where the paging response may be determined based on a presence of an active connection of the first USIM when the paging message is associated with the second USIM.

In some examples of the method, apparatuses, and non-transitory computer-readable medium described herein, the paging response is to ignore the paging message. In some examples of the method, apparatuses, and non-transitory computer-readable medium described herein, the paging response is a busy indication. In some examples of the method, apparatuses, and non-transitory computer-readable medium described herein, the busy indication includes a time interval for a busy state at the UE. In some examples of the method, apparatuses, and non-transitory computer-readable medium described herein, the time interval for the busy state indicates to the base station that further paging messages are to be delayed until an expiration of the time interval, and where the UE is not declared UE unreachable, or may be declared temporarily unreachable for the service, until the expiration of the time interval.

In some examples of the method, apparatuses, and non-transitory computer-readable medium described herein, the paging response includes a service request message or registration request message that is transmitted after expiration of a random delay interval. In some examples of the method, apparatuses, and non-transitory computer-readable medium described herein, a maximum duration of the random delay interval is based on a type of service associate with the paging message, a configured maximum duration, or any combinations thereof.

A method for wireless communications at a base station is described. The method may include transmitting a paging message to a UE, the paging message transmitted on an access stratum layer and including an indication of a service that caused the paging message, monitoring for a paging response from the UE based on the indication of the service that caused the paging message and a non-access stratum layer configuration of the UE, and determining one or more subsequent actions for communications with the UE based on the monitoring for the paging response.

An apparatus for wireless communications at a base station is described. The apparatus may include a processor, memory coupled with the processor, and instructions stored in the memory. The instructions may be executable by the processor to cause the apparatus to transmit a paging message to a UE, the paging message transmitted on an access stratum layer and including an indication of a service that caused the paging message, monitor for a paging response from the UE based on the indication of the service that caused the paging message and a non-access stratum layer configuration of the UE, and determine one or more subsequent actions for communications with the UE based on the monitoring for the paging response.

Another apparatus for wireless communications at a base station is described. The apparatus may include means for transmitting a paging message to a UE, the paging message transmitted on an access stratum layer and including an indication of a service that caused the paging message, means for monitoring for a paging response from the UE based on the indication of the service that caused the paging message and a non-access stratum layer configuration of the UE, and means for determining one or more subsequent actions for communications with the UE based on the monitoring for the paging response.

A non-transitory computer-readable medium storing code for wireless communications at a base station is described. The code may include instructions executable by a processor to transmit a paging message to a UE, the paging message transmitted on an access stratum layer and including an indication of a service that caused the paging message, monitor for a paging response from the UE based on the indication of the service that caused the paging message and a non-access stratum layer configuration of the UE, and determine one or more subsequent actions for communications with the UE based on the monitoring for the paging response.

In some examples of the method, apparatuses, and non-transitory computer-readable medium described herein, the monitoring for the paging response may be based on one or more of a type or capability of the UE, a MUSIM status of the UE, an idle or active state of the UE, a network configuration of the UE, a DNN or network slice associated with the paging message, or any combinations thereof. In some examples of the method, apparatuses, and non-transitory computer-readable medium described herein, the paging response includes a busy indication. In some examples of the method, apparatuses, and non-transitory computer-readable medium described herein, the paging response further includes a time interval.

Some examples of the method, apparatuses, and non-transitory computer-readable medium described herein may further include operations, features, means, or instructions for deferring a retransmission of the paging message, responsive to the busy indication provided in the paging response, until after the time interval. Some examples of the method, apparatuses, and non-transitory computer-readable medium described herein may further include operations, features, means, or instructions for starting a timer having a value of the time interval, declaring the UE temporarily unreachable, and declaring the UE reachable when the timer expires. Some examples of the method, apparatuses, and non-transitory computer-readable medium described herein may further include operations, features, means, or instructions for declaring the UE unreachable when the paging response is not received within a defined time period after transmitting the paging message.

In some examples of the method, apparatuses, and non-transitory computer-readable medium described herein, the paging message includes an explicit indication of the service that caused the paging message. In some examples of the method, apparatuses, and non-transitory computer-readable medium described herein, the paging message includes an identification that is associated with the paging message, the identification corresponding to the service that caused the paging message. In some examples of the method, apparatuses, and non-transitory computer-readable medium described herein, the UE includes a first USIM and a second USIM, and where the one or more subsequent actions for communications with the UE may be determined based on a presence of an active connection of the first USIM when the paging message may be associated with the second USIM.

DETAILED DESCRIPTION

Figure 1:
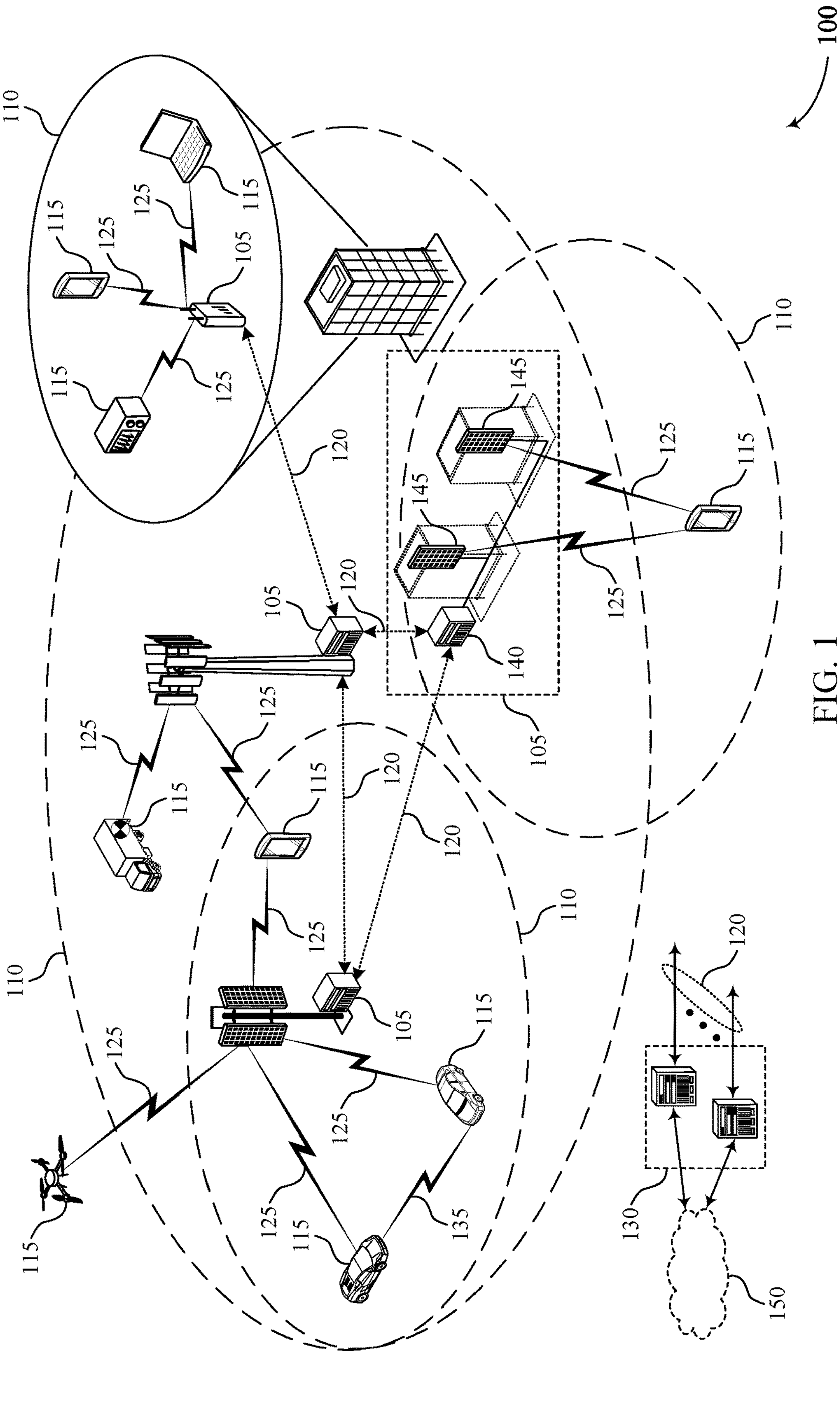
FIG. 1 illustrates an example of a wireless communications system that supports service-based paging techniques in accordance with aspects of the present disclosure.

In some wireless communications systems, a user equipment (UE) may operate in a radio resource control (RRC) idle mode or an RRC inactive mode, each of which may be referred to as an inactive state, until the UE has data to transmit or receive (e.g., or another operation to perform via a network connection). The UE may communicate with the network by establishing an RRC connection and transitioning to an RRC connected mode, which may be referred to as an active state. The UE may be configured to monitor a paging channel for paging from the network (e.g., the UE may be configured with a discontinuous reception (DRX) cycle for paging), which may indicate how frequently the UE may monitor the paging channel. The UE may monitor for paging according to its configuration while operating in the inactive state to reduce power consumption (e.g., the UE may consume less power while operating in an inactive state than in an active state), and a paging message may indicate whether the UE is to transition to an active state to receive data. Various aspects of the present disclosure provide enhanced paging techniques that may improve UE and network efficiency and operation.

More specifically, in some cases, when the UE is in idle mode and the network needs to establish a connection (e.g. due to incoming voice call, short message service (SMS) or downlink data linked to another service) the network uses paging to trigger the UE to establish connection with the network. The paging procedure may provide that a base station sends a paging message to the UE, which is received by the access stratum (AS) layer in the UE. The AS layer in the UE then provides a paging indication to the non-access stratum (NAS) layer, and the NAS layer initiates the appropriate connection establishment procedure with the network to respond to paging. The connection establishment procedure may include, for example, a service request procedure (e.g., a SERVICE REQUEST message) or registration procedure (e.g., a REGISTRATION REQUEST message). Existing paging procedures provide that the UE must respond to paging at the earliest possible occasion. If the UE does not respond to paging, the network may re-try the paging message one or more times. If the UE does not respond after a number of retries (e.g., after N retries), the network may declare the UE "unreachable," which may have impact on the handling of future incoming connections. In current paging procedures the paging message from the network and the paging indication from the AS layer do not provide any indication about the reason for paging (e.g., the service that caused the paging message), thus there is no indication of a paging cause in the paging message or in the paging indication from the AS layer to the NAS layer.

In some cases, it may be beneficial for the UE to have information related to a service that caused the paging message. For example, for a multiple universal subscriber identity module (MUSIM) UE (e.g., a UE that has two or more USIMs) in dual active mode, the UE may be in active communication with the network over a first USIM when the network sends a paging message for a second USIM. In accordance with various techniques discussed herein, the UE in such cases may decide not to respond to paging for the second USIM. For example, if a user of the UE is engaged in a voice call over the first USIM, the user may not be interested in answering the incoming voice call (or initiating some other service) over the second USIM, in order not to disturb the call over the first USIM. Thus, the paging message on the second USIM may be ignored in order to provide a better user experience. In other cases, if the user is engaged in group messaging over the first USIM, there may not be an interest in receiving messages from the same application or group over the second USIM, and thus a paging message for the same service may be ignored. Such techniques may provide that if the user is not interested in the service over the second USIM, it is better to dedicate all the resources to the active connection over the first USIM.

Further, in some cases a UE may be subscribed or otherwise configured to receive a multicast/broadcast service (MBS). When the UE is paged for a multicast service, several UEs may receive the paging at the same time, such as when a subscribed service or programming is about to start. In some cases, there could be a large density of UEs subscribed to or interested in a particular MBS in an area, and if all the UEs were to respond to paging at the same time, there could be a congestion in the uplink, leading to delayed service delivery and poor user experience. In some cases, the UE may transmit a paging response to the MBS page, but may delay the transmission of the paging response in order to avoid network congestion. For example, a UE may determine a random backoff and set a timer based on the random backoff, and transmit the paging response upon expiration of the timer.

In some cases, paging techniques as discussed herein may provide a paging message that includes an indication of a service that caused the page. Based on the service that caused the page and a current UE status, the UE may determine how to respond to the page. Such techniques may thus enhance user experience through fewer interruptions in service associated with a paging response, through less network congestion when multiple UEs are paged within a short time period, and the like, compared to existing paging procedures in which there is no awareness to the service that triggered the paging and the UE must respond to paging as soon as possible. Techniques discussed herein that provide an indication of a service that caused a page may allow the UE to determine the type of service that triggered the paging and handle the paging response depending on the type of service and additional considerations, such as a type of UE (e.g., a MUSIM UE with an ongoing active connection on one USIM), user preferences, UE configuration, one or more other considerations such as the data network name (DNN) or the slice that the connection is associated with, or any combinations thereof.

Aspects of the disclosure are initially described in the context of wireless communications systems. Aspects of the disclosure are further illustrated by and described with reference to timing diagrams, process flows, apparatus diagrams, system diagrams, and flowcharts that relate to service-based paging techniques.

FIG. 1 illustrates an example of a wireless communications system 100 that supports service-based paging techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack that may include an AS layer and NAS layer. For the AS layer, in the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels. The NAS layer may provide bearers (e.g., Evolved Packet System (EPS) bearers) based on protocols which operate between UE and the core network 130 for mobility management and session management between the UE and, for example, a MME at the core network 130.

In some cases, a base station 105 may transmit paging messages to one or more UEs 115 that may provide an indication of a service that caused the page. In such cases, a receiving UE 115 may determine a paging response based on a UE status and the service that caused the page. In some cases, the UE 115 be a MUSIM device, and may have an active connection on a first USIM, where a paging response on a second USIM may cause an interruption in the active connection. In such cases, the UE 115 may elect to ignore the page, or may transmit a paging response with a busy indication. In other cases, the page may be associated with a MBS service that transmits paging messages to multiple UEs at once, and the receiving UE 115 may transmit a paging response after a delay (e.g., a random delay period) in order to avoid congestion associated with multiple UEs 115 transmitting a paging response using a same set of resources.

In some cases, the paging message may be received at an AS layer of the UE 115, and the AS layer may provide the paging message to the NAS layer along with the indication of the service that caused the page. The NAS layer may then determine the paging response. In some cases, the paging response may include ignoring the paging message, responding to the paging message according to a baseline paging response (e.g., a legacy paging response according to established paging procedures), responding to the paging message with a busy indication, responding to the paging message after an expiration of a delay time period, or combinations thereof.

Figure 2:
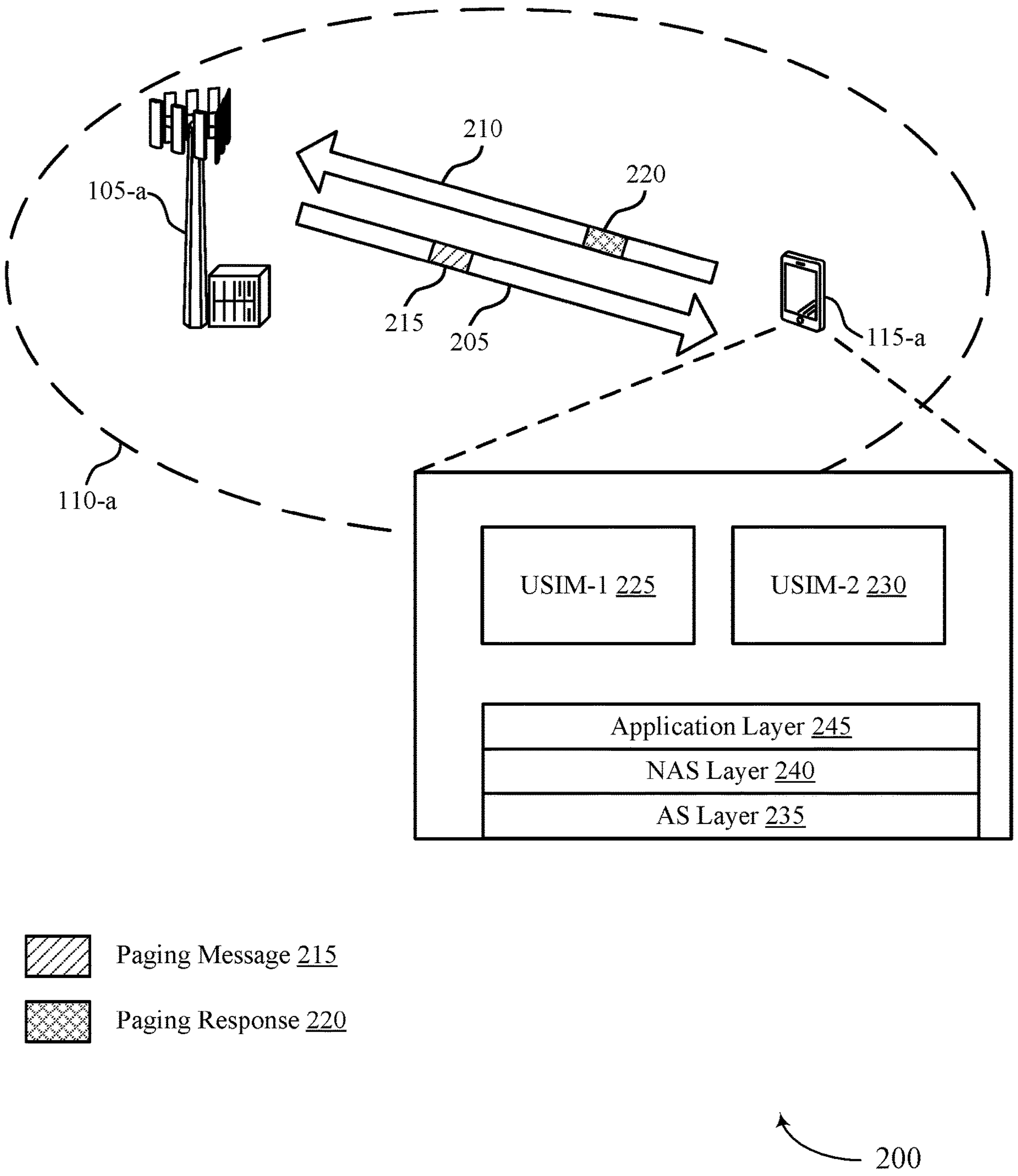
FIG. 2 illustrates an example of a portion of a wireless communications system that supports service-based paging techniques in accordance with aspects of the present disclosure.

FIG. 2 illustrates an example of a wireless communications system 200 that supports service-based paging techniques in accordance with aspects of the present disclosure. The wireless communications system 200 may include a UE 115-*a* (e.g., among other UEs 115), and base station 105-*a*, which may represent examples of a UE 115 and a base station 105, as described with reference to FIG. 1. Base station 105-*a* may communicate with UE 115-*a* in a geographic coverage area 110-*a* via downlink communications link 205 and uplink communications link 210. Communications links 205 and 210 may be on a same carrier or on different carriers. Base station 105-*a* may communicate with a core network (e.g., an AMF at a core network) via a backhaul link, as described with reference to FIG. 1.

UE 115-*a* may operate in one or more of an RRC idle mode, an RRC inactive mode, and an RRC connected mode. For example, UE 115-*a* may operate in an RRC idle or RRC inactive mode (which may be referred to herein as inactive states) until UE 115-*a* has data to transmit, data to receive, or another operation to perform (e.g., in which a connection to the core network may be desired). If UE 115-*a* has data to transmit or if UE 115-*a* receives an indication (e.g., via a paging message or some other signaling) of a forthcoming data message for reception by UE 115-*a*, UE 115-*a* may establish an RRC connection with base station 105-*a*, and UE 115-*a* may transition to an RRC connected mode (which may be referred to herein as an active state). Once the data session is complete, base station 105-*a* may transmit an RRC release message to release UE 115-*a*, and UE 115-*a* may return to the inactive state. UE 115-*a* may consume less power while operating in the inactive state than the active state, and in some cases, UE 115-*a* may default to the inactive state to reduce power consumption.

The paging procedure may provide that the base station 105-*a* sends a paging message 215 to the UE 115-*a*, which is received by the AS layer 235 in the UE 115-*a*. The AS layer 235 in the UE 115-*a* may then provide a paging indication to the NAS layer 240, and the NAS layer 240 initiates the appropriate connection establishment procedure with the network to respond to paging. The connection establishment procedure may include, for example, a service request procedure (e.g., a SERVICE REQUEST message) or registration procedure (e.g., a REGISTRATION REQUEST message). As discussed herein, existing paging procedures provide that the UE 115-*a* must respond to paging with a paging response 220 at the earliest possible occasion. In accordance with various techniques as discussed herein, the paging message 215 may include an indication of a service that caused the page, which may be used at the NAS layer 240 to determine how to respond to the page.

In the example of FIG. 2, the UE 115-*a* may be a MUSIM device with a first USIM 225 and a second USIM 230. In some cases, it may be beneficial for the UE 115-*a* to have information related to the service that caused the paging message 215. For example, the UE 115-*a* may be in active communication with the network over the first USIM 225 (e.g., an application at application layer 245 may be actively exchanging data with the network) when the network sends paging message 215 for the second USIM 230. In some cases, the UE 115-*a* may decide not to respond to the paging message 215 for the second USIM 230 (e.g., a user of the UE 115-*a* that is engaged in a voice call over the first USIM 225 may not be interested in answering the incoming voice call (or initiating some other service) over the second USIM 230). Thus, the paging message 215 on the second USIM 230 may be ignored in order to provide a better user experience. In other cases, if the user is engaged in group messaging over the first USIM 225, there may not be an interest in receiving messages from the same application or group over the second USIM 230, and thus a paging message 215 for the same service may be ignored. Such techniques may provide that if the user is not interested in the service over the second USIM 230, it is better to dedicate all the resources to the active connection over the first USIM. In some cases, the user of the UE 115-*a* may provide preferences on whether a paging response 220 is transmitted for a USIM in the inactive state when another USIM is in the active state. In some cases, such preferences may prioritize different types of services, and the prioritization may be used to determine the response to the paging message 215 (e.g., transmitting a paging response 220, ignoring the paging message, providing a busy indication, transmitting the paging response 220 after a delay, and the like).

Further, in some cases UE 115-*a* may be subscribed or otherwise configured to receive a MBS. As discussed herein, in some cases, there could be a large density of UEs subscribed to or interested in a particular MBS in an area, and if all the UEs were to respond to paging at the same time, there could be a congestion in the uplink, leading to delayed service delivery and poor user experience. In some cases, the UE 115-*a* may transmit paging response 220 based on an MBS page, but may delay the transmission of the paging response 220 in order to avoid network congestion (e.g., UE 115-*a* may determine a random backoff, set a timer based on the random backoff, and transmit the paging response 220 upon expiration of the timer). An example of such a delayed paging response 220 transmission is discussed in more detail with reference to FIG. 3.

Figure 3:
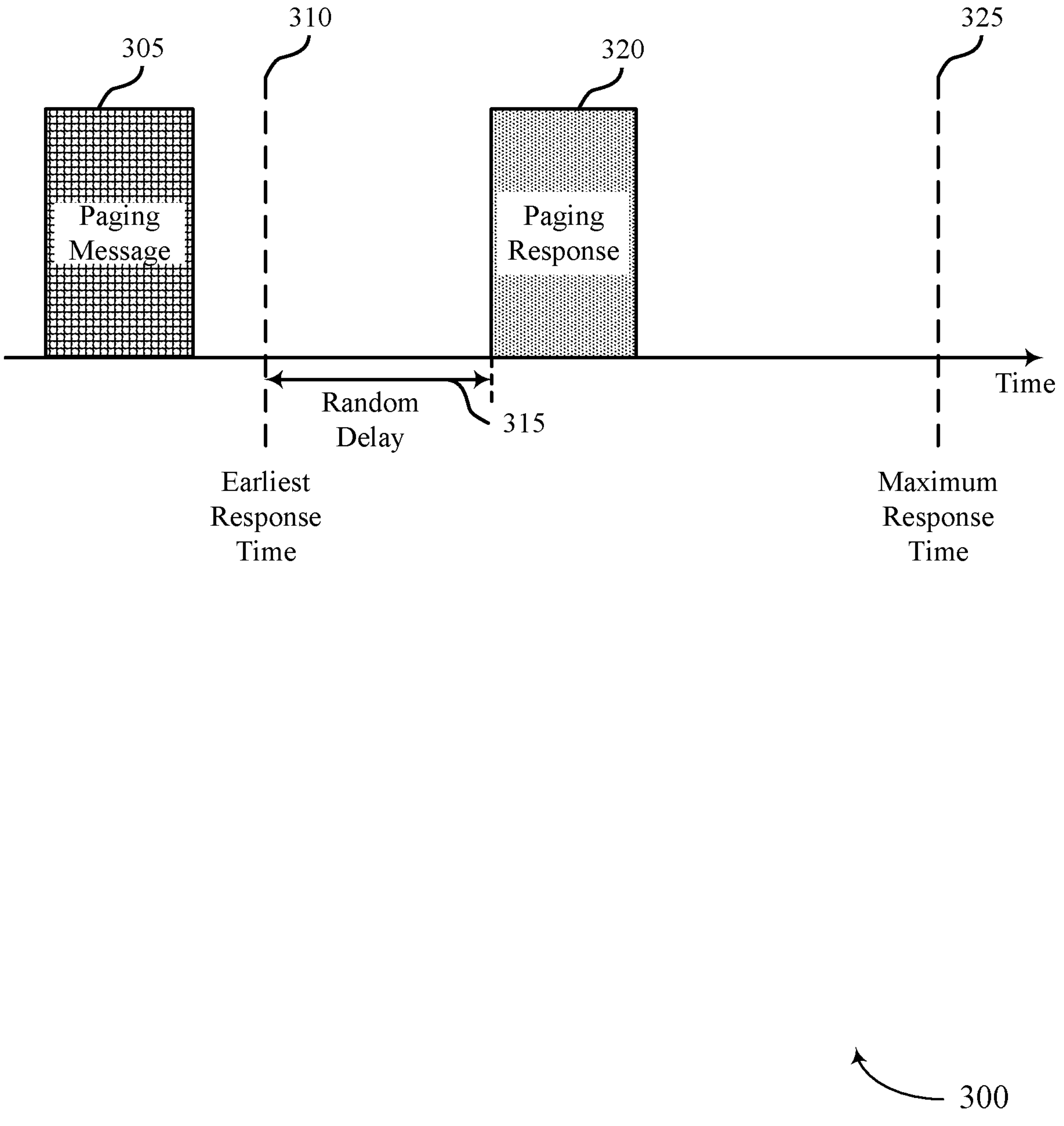
FIG. 3 illustrates an example of a paging timeline that supports service-based paging techniques in accordance with aspects of the present disclosure.

As discussed, in some aspects of the present disclosure the paging message 215 provides paging cause indicating the service that caused the page. The AS layer 235 receives the paging with the paging cause and forwards the paging indication with the paging cause to the NAS layer 240. The NAS layer 240 determines, based on the paging indication and the paging cause, how to handle the paging. Besides the paging cause, the NAS layer 240 may consider one or more of the following associated with a status or parameters of the UE 115-*a*: the UE type or capability (e.g., a MUSIM device), the UE state (e.g., RRC idle or RRC inactive), user preferences (e.g., that may be preconfigured or input by the user upon receiving the paging (via a user interface)), a configuration provided by the network, a DNN or the slice that the connection would be associated with, or any combinations thereof. Upon the determination of the service that caused the page and the UE 115-*a* status, possible responses to the paging message 215 may include, for example: ignoring the page (e.g., for MUSIM device, the UE 115-*a* may consider the active connection over one USIM and determine to not initiate a service request procedure to respond to paging); transmitting a paging response 220 in accordance with a baseline paging procedure (e.g., based on legacy paging techniques); responding to the page with "busy" indication (e.g., which may include an associated busy time period following which the base station 105-*a* may retransmit paging message 215); responding to the page with a delay (e.g., such as illustrated in FIG. 3); or combinations thereof. In cases where the UE 115-*a* provides a busy indication, the UE 115-*a* may transmit a SERVICE REQUEST or REGISTRATION REQUEST message comprising a "busy" indication, which in some cases may additionally include a time interval for the validity of the busy state. The network may use this indication to handle future incoming pages for this UE 115-*a* and/or for this service. For example, the network could delay further pages until the end of the interval without declaring the UE 115-*a* unreachable, or the network could declare the UE 115-*a* "temporarily unreachable" for this service until the end of the interval and then declare the UE 115-*a* reachable (thereby allowing pages for this service subsequent to the indicated interval).

In some cases, the paging cause may be explicitly indicated in the paging message 215. For example, the paging message 215 may include one or more bits that indicate a paging cause or service (e.g., a voice call, SMS, DL data, etc.). In some cases, different paging causes may be mapped to bit values of a paging cause field provided with the paging message 215. In other cases, the paging cause may be implicitly indicated in the paging message 215. For example, a page associated with a MBS may include a parameter or identification that is associated with the MBS, such as a MBS service identity (ID) that may be provided in the paging message 215, from which the UE 115-*a* would infer that the paging is for MBS.

FIG. 3 illustrates an example of a paging timeline 300 that supports service-based paging techniques in accordance with aspects of the present disclosure. In some examples, paging timeline 300 may implement aspects of the wireless communications systems 100 and 200, as described with reference to FIGS. 1 and 2. For example, paging timeline 300 may illustrate timings for paging messages and paging responses between a base station 105 and a UE 115.

In the example of FIG. 3, the UE may insert a time delay in a paging response. The UE may receive paging message 305, and determine to transmit a paging response 320. In this example, the paging message 305 may be associated with a service for which a random delay 315 after an earliest response time 310 is inserted in advance of the paging response 320. For example, paging message 305 may be associated with a MBS service, and a relatively large number of UEs may receive the paging message 305. In order to reduce the likelihood of congestion associated with multiple concurrent responses, this service may be configured to provide paging response 320 after the random delay 315.

In some cases, the UE may randomly select a backoff counter value and initiate a backoff counter that corresponds to a paging response 320 timer. Upon expiration of the backoff counter, the UE may transmit the paging response 320. In some cases, a maximum response time 325 may be configured, such that the maximum value of the backoff counter corresponds to the maximum response time 325. In some cases, the network (e.g., AMF of the core network) may configure the UE with the maximum response time 325 for paging (e.g., via pre-configuration (by the home network) or via a NAS signaling protocol (by the serving network)). In some cases, duration of the random delay 315 interval may be based on the type of the service, and may be configured by the network (e.g., via pre-configuration, NAS signaling, etc.). Such techniques may avoid congestion in paging responses, and result in fewer retransmissions of paging responses 320, thus reducing UE power consumption and providing for more efficient use of network resources.

Figure 4:
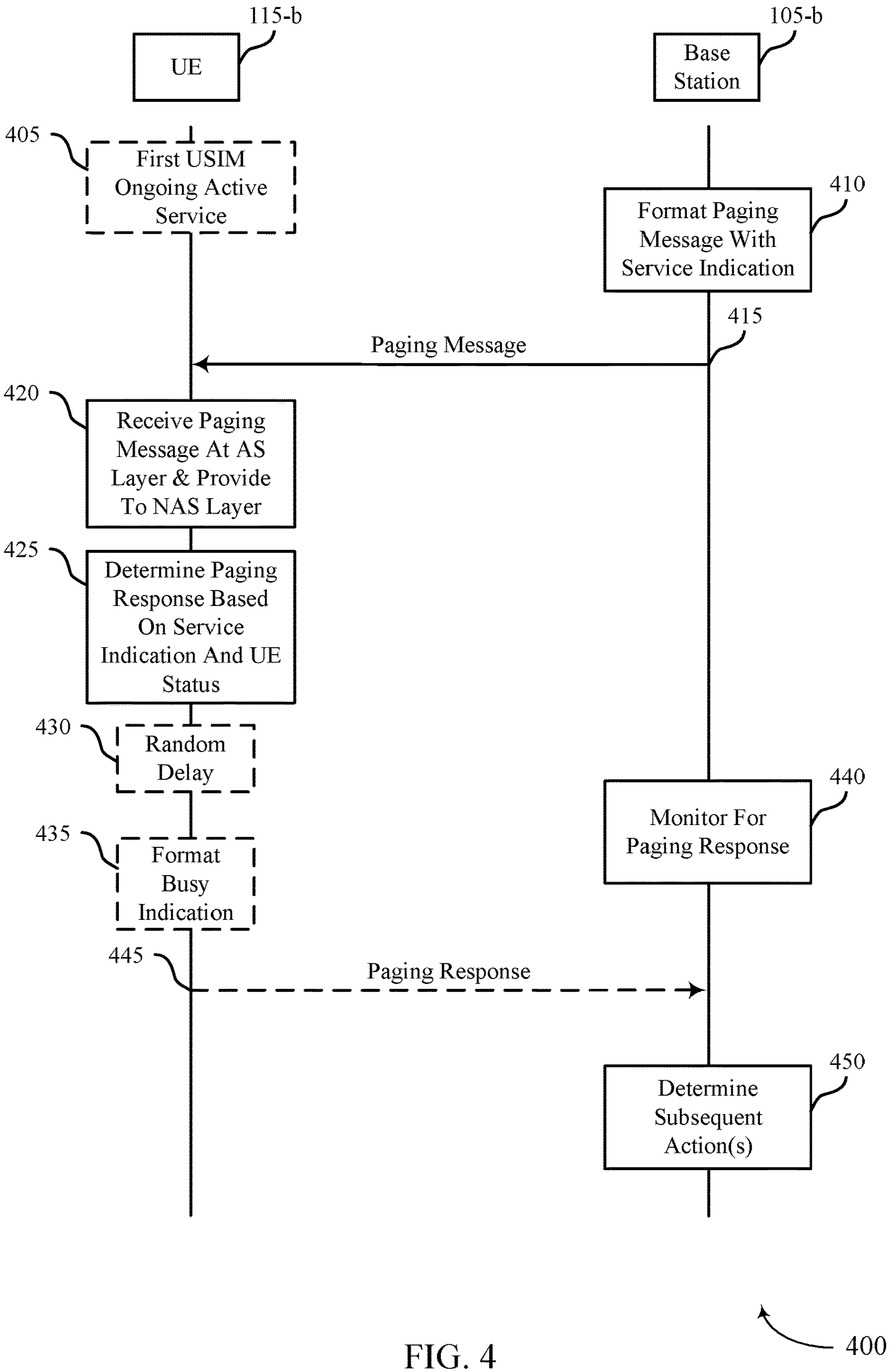
FIG. 4 illustrates an example of a process flow that supports service-based paging techniques in accordance with aspects of the present disclosure.

FIG. 4 illustrates an example of a process flow 400 that supports service-based paging techniques in accordance with aspects of the present disclosure. The process flow 400 may implement various aspects of the present disclosure described with reference to FIGS. 1-3. The process flow 400 may include UE 115-*b* and base station 105-*b*, which may be examples of UEs 115 and base stations 105 as described with reference to FIGS. 1-3.

In the following description of the process flow 400, the operations between UE 115-*b* and base station 105-*b* may be performed in different orders or at different times. Certain operations may also be left out of the process flow 400, or other operations may be added. It is to be understood that while UE 115-*b* is shown communicating with base station 105-*b*, any number of UEs 115 or other devices may transmit and receive paging communications with a base station 105, or another network entity (e.g., an AMF, MME, etc.).

Optionally, at 405, UE 115-*b* may be a MUSIM device, and may determine a status of the USIMs, such as that a first USIM has an ongoing active service. In some cases, when multiple USIMs are active, the UE 115-*b* may identify the USIM status based on an active or inactive state.

At 410, the base station 105-*b* may format a paging message with a service indication. In some cases, the base station 105-*b* may determine that a service has triggered a page to the UE 115-*b*, and may format a bit field in the paging message with an indication of the service that caused the page. In some cases, the indication may be an explicit indication that in provided in a bit field (e.g., a two-bit or three-bit service indication field) in which bit values are mapped to different services (e.g., a first bit field value is mapped to a voice service, a second bit field value is mapped to a MBS service, a third bit field value is mapped to a group messaging service, etc.). In some cases, the indication may provide a DNN or a network slice indication (e.g., an indication of a high-reliability and low-latency network slice, a mobile broadband network slice, etc.), which may be associated with one or more services. At 415, the base station 105-*b* may transmit the paging message to the UE 115-*b*.

At 420, the UE 115-*b* may receive the paging message at an AS layer, and provide the paging message with service indication to the NAS layer at the UE 115-*b*. At 425, the UE 115-*b* may determine a paging response based on the service indication and a UE 115-*b* status. For example, the MUSIM status of the UE 115-*b* may indicate that the first USIM has an active connection, and the NAS layer at the UE 115-*b* may determine to ignore the paging message. In some cases, the service indication may be associated with a service (e.g., a MBS) that is configured for a random delay, and at 430 the UE 115-*b* may start a random delay timer for transmitting the paging response. In some cases, at 435, if a first USIM has an active connection, the UE 115-*b* may format a busy indication for transmission with paging response (e.g., with an indication of a busy time period, or that indicates a quantized busy time period that is preconfigured). At 445, in cases where the UE 115-*b* determines to transmit a paging response, the UE 115-*b* may transmit the paging response to the base station 105-*b*.

At 440, the base station 105-*b* may monitor for the paging response. At 450, the base station may determine one or more subsequent actions based on whether a paging response was received from the UE 115-*b* and content of the paging response. In some cases, if the paging response is not received, the base station 105-*b* may declare the UE 115-*b* unreachable for the particular service of the paging message. In some cases, if the paging response is received and includes a busy indication, the base station 105-*b* may declare the UE 115-*b* temporarily unreachable for the service and may subsequently declare the UE reachable (e.g., after a time period indicated by the paging response, after a preconfigured time period, etc.), following which the base station 105-*b* may retransmit the paging message. In some cases, the service associated with the paging message may be configured for a random delayed paging response, and the base station 105-*b* may monitor for the paging response based on a time window associated with the delayed paging response, and perform service request or registration request procedures associated with the paging response.

Figure 5:
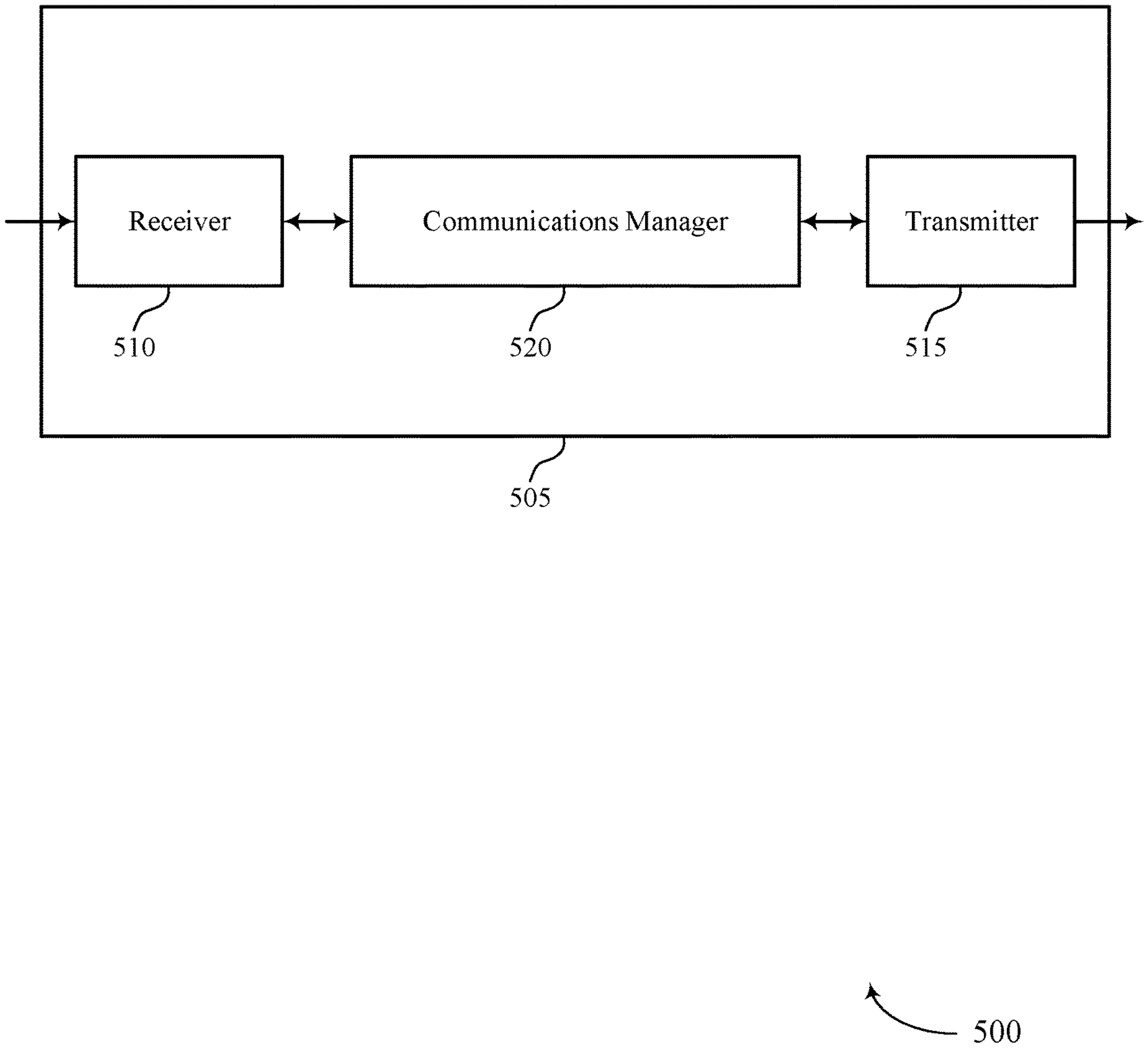
FIGS. 5 and 6 show block diagrams of devices that support service-based paging techniques in accordance with aspects of the present disclosure.

FIG. 5 shows a block diagram 500 of a device 505 that supports service-based paging techniques in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to service-based paging techniques). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to service-based paging techniques). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of service-based paging techniques as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, at an access stratum layer of the UE, a paging message from a base station, the paging message including an indication of a service that caused the paging message. The communications manager 520 may be configured as or otherwise support a means for providing the paging message, including the indication of the service that caused the paging message, to a non-access stratum layer of the UE. The communications manager 520 may be configured as or otherwise support a means for responding to the paging message based on a determination at the non-access stratum layer of a paging response, the paging response based on the indication of the service and one or more parameters of the UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for service-based paging responses that may provide for efficient paging responses based on the service that caused the page and a device status, which may result in reduced processing and reduced power consumption, and more efficient utilization of communication resources.

Figure 6:
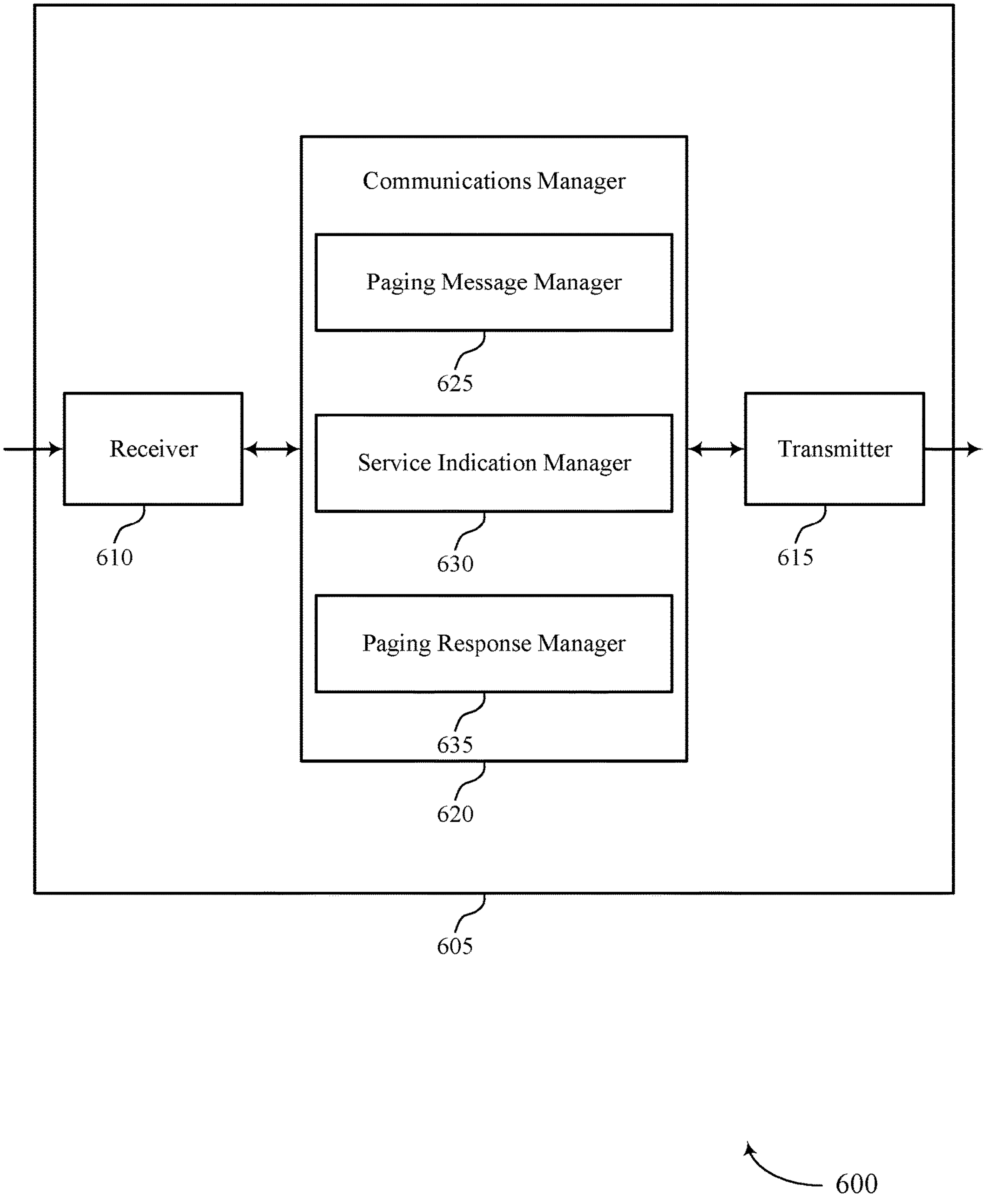

FIG. 6 shows a block diagram 600 of a device 605 that supports service-based paging techniques in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to service-based paging techniques). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to service-based paging techniques). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of service-based paging techniques as described herein. For example, the communications manager 620 may include a paging message manager 625, a service indication manager 630, a paging response manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The paging message manager 625 may be configured as or otherwise support a means for receiving, at an access stratum layer of the UE, a paging message from a base station, the paging message including an indication of a service that caused the paging message. The service indication manager 630 may be configured as or otherwise support a means for providing the paging message, including the indication of the service that caused the paging message, to a non-access stratum layer of the UE. The paging response manager 635 may be configured as or otherwise support a means for responding to the paging message based on a determination at the non-access stratum layer of a paging response, the paging response based on the indication of the service and one or more parameters of the UE.

Figure 7:
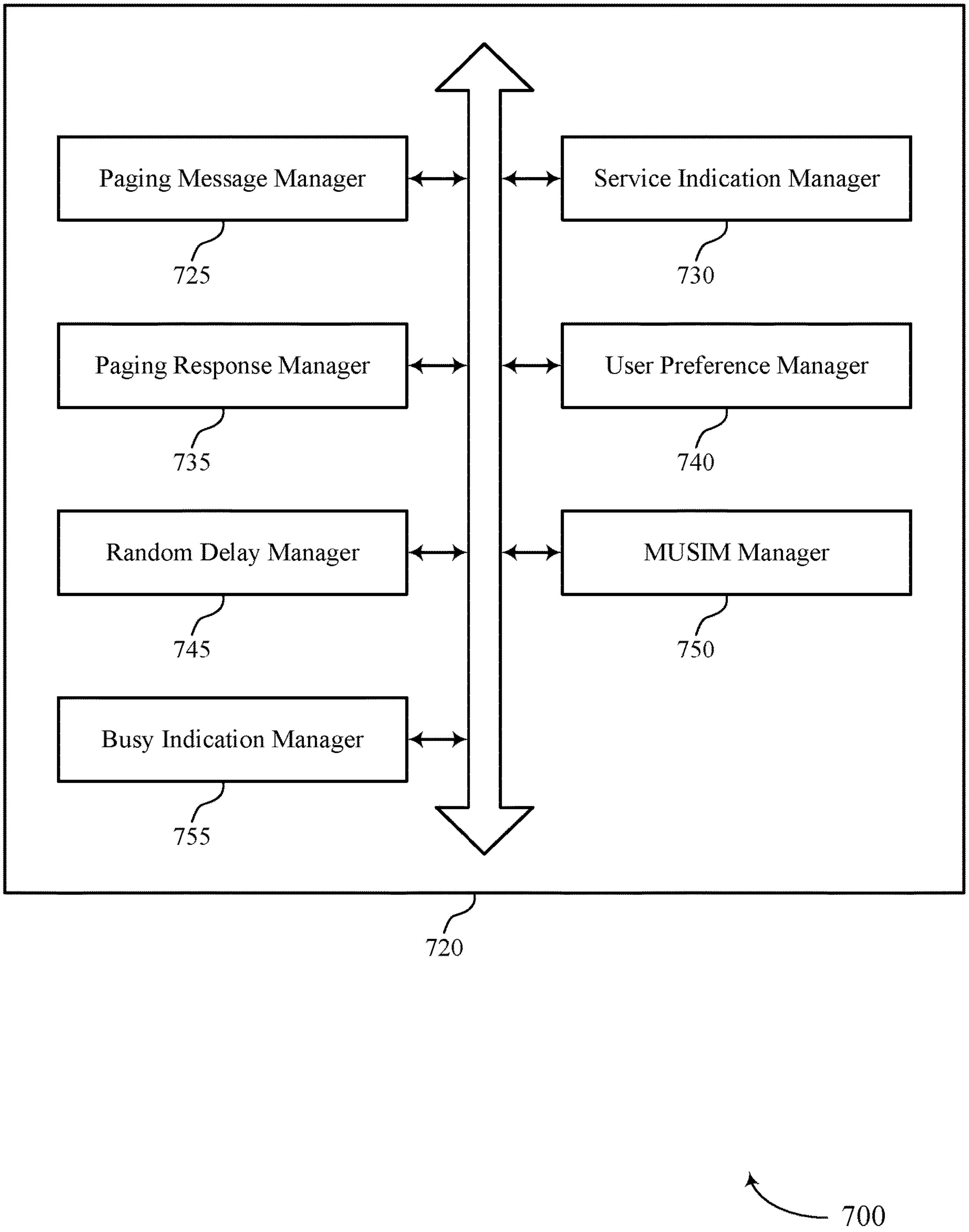
FIG. 7 shows a block diagram of a communications manager that supports service-based paging techniques in accordance with aspects of the present disclosure.

FIG. 7 shows a block diagram 700 of a communications manager 720 that supports service-based paging techniques in accordance with aspects of the present disclosure. The communications manager 720 may be an example of aspects of a communications manager 520, a communications manager 620, or both, as described herein. The communications manager 720, or various components thereof, may be an example of means for performing various aspects of service-based paging techniques as described herein. For example, the communications manager 720 may include a paging message manager 725, a service indication manager 730, a paging response manager 735, a user preference manager 740, a random delay manager 745, a MUSIM manager 750, a busy indication manager 755, or any combination thereof. Each of these components may communicate, directly or indirectly, with one another (e.g., via one or more buses).

The communications manager 720 may support wireless communications at a UE in accordance with examples as disclosed herein. The paging message manager 725 may be configured as or otherwise support a means for receiving, at an access stratum layer of the UE, a paging message from a base station, the paging message including an indication of a service that caused the paging message. The service indication manager 730 may be configured as or otherwise support a means for providing the paging message, including the indication of the service that caused the paging message, to a non-access stratum layer of the UE. The paging response manager 735 may be configured as or otherwise support a means for responding to the paging message based on a determination at the non-access stratum layer of a paging response, the paging response based on the indication of the service and one or more parameters of the UE.

In some examples, the paging response is determined based on one or more of a type or capability of the UE, a multiple universal subscriber identity module (MUSIM) status of the UE, an idle or active state of the UE, a user preference provided to the UE, a network configuration of the UE, a data network name (DNN) or network slice associated with the paging message, or any combinations thereof. In some examples, the paging response includes ignoring the paging message, responding to the paging message according to a baseline paging response, responding to the paging message with a busy indication, or responding to the paging message after an expiration of a delay time period. In some examples, the paging message includes an explicit indication of the service that caused the paging message.

In some examples, the service indication manager 730 may be configured as or otherwise support a means for determining, based on an identification associated with the paging message, the service that caused the paging message.

In some examples, the service indication manager 730 may be configured as or otherwise support a means for determining, based on a parameter included in the paging message, the service that caused the paging message. In some examples, the parameter included in the paging message is an identity associated with the service.

In some examples, the user preference manager 740 may be configured as or otherwise support a means for receiving, from a user, one or more preferences for responding to paging messages associated with one or more services, and where the determination at the non-access stratum layer of the paging response is based on the one or more preferences.

In some examples, the random delay manager 745 may be configured as or otherwise support a means for determining a random response time for transmitting a response to the paging message based on a preconfigured maximum paging response time or a configuration provided in non-access stratum signaling. In some examples, the random delay manager 745 may be configured as or otherwise support a means for starting a timer with a duration of the random response time. In some examples, the random delay manager 745 may be configured as or otherwise support a means for transmitting the paging response upon expiry of the timer.

In some examples, the UE includes a first universal subscriber identity module (USIM) and a second USIM, and where the paging response is determined based on a presence of an active connection of the first USIM when the paging message is associated with the second USIM. In some examples, the paging response is to ignore the paging message. In some examples, the paging response is a busy indication. In some examples, the busy indication includes a time interval for a busy state at the UE.

In some examples, the time interval for the busy state indicates to the base station that further paging messages are to be delayed until an expiration of the time interval, and where the UE is not declared UE unreachable, or is declared temporarily unreachable for the service, until the expiration of the time interval. In some examples, the paging response includes a service request message or registration request message that is transmitted after expiration of a random delay interval. In some examples, a maximum duration of the random delay interval is based on a type of service associate with the paging message, a configured maximum duration, or any combinations thereof.

Figure 8:
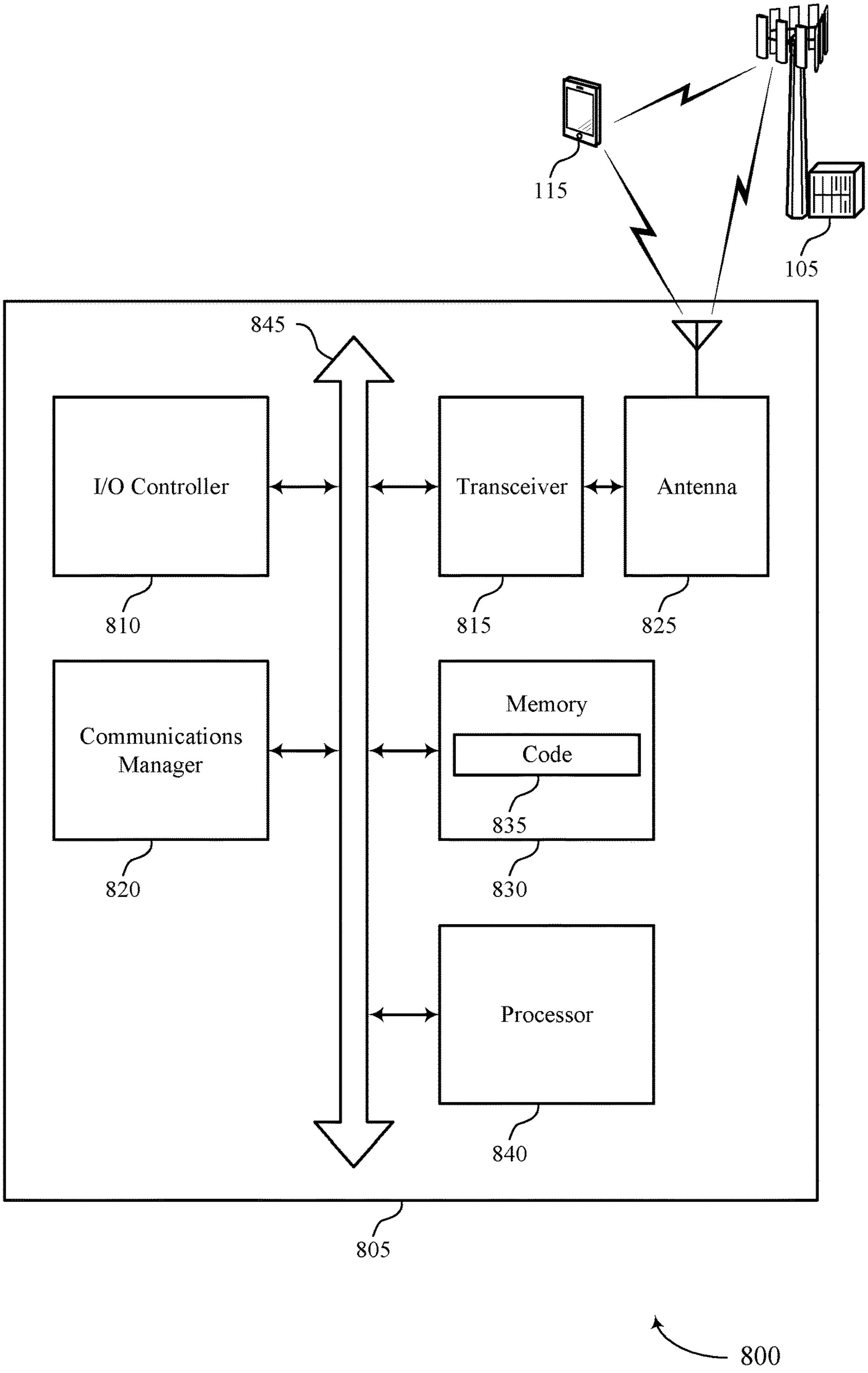
FIG. 8 shows a diagram of a system including a device that supports service-based paging techniques in accordance with aspects of the present disclosure.

FIG. 8 shows a diagram of a system 800 including a device 805 that supports service-based paging techniques in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting service-based paging techniques). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, at an access stratum layer of the UE, a paging message from a base station, the paging message including an indication of a service that caused the paging message. The communications manager 820 may be configured as or otherwise support a means for providing the paging message, including the indication of the service that caused the paging message, to a non-access stratum layer of the UE. The communications manager 820 may be configured as or otherwise support a means for responding to the paging message based on a determination at the non-access stratum layer of a paging response, the paging response based on the indication of the service and one or more parameters of the UE.

By including or configuring the communications manager 820 in accordance with examples as described herein, the device 805 may support techniques for service-based paging responses that may provide for efficient paging responses based on the service that caused the page and a device status, which may result in reduced processing and reduced power consumption, more efficient utilization of communication resources, improved user experience related to reduced service interruptions, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of service-based paging techniques as described herein, or the processor 840 and the memory 830 may be otherwise configured to perform or support such operations.

Figure 9:
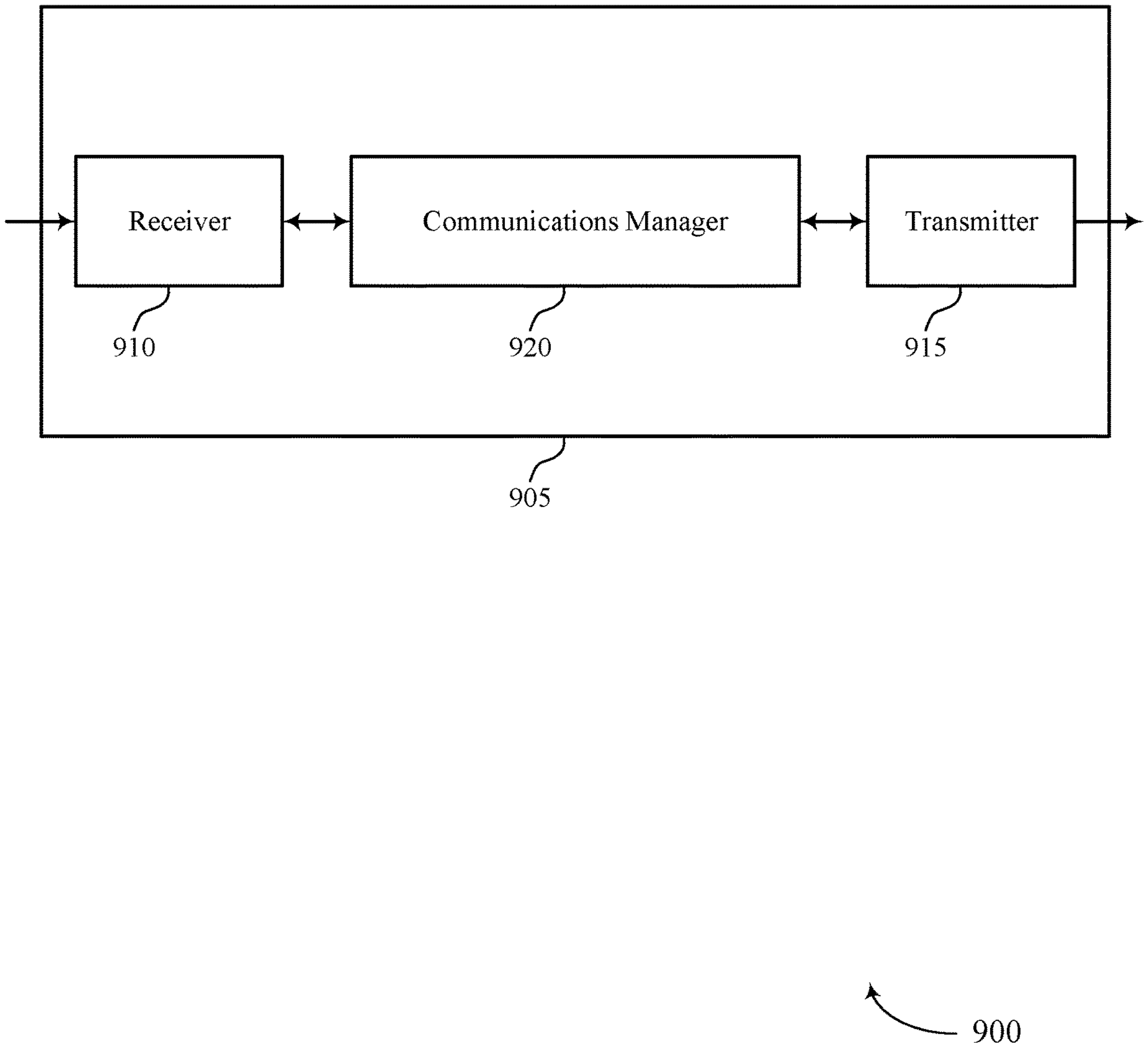
FIGS. 9 and 10 show block diagrams of devices that support service-based paging techniques in accordance with aspects of the present disclosure.

FIG. 9 shows a block diagram 900 of a device 905 that supports service-based paging techniques in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to service-based paging techniques). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to service-based paging techniques). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of service-based paging techniques as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting a paging message to a UE, the paging message transmitted on an access stratum layer and including an indication of a service that caused the paging message. The communications manager 920 may be configured as or otherwise support a means for monitoring for a paging response from the UE based on the indication of the service that caused the paging message and a non-access stratum layer configuration of the UE. The communications manager 920 may be configured as or otherwise support a means for determining one or more subsequent actions for communications with the UE based on the monitoring for the paging response.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for service-based paging responses that may provide for efficient paging responses based on the service that caused the page and a device status, which may result in reduced processing and reduced power consumption.

Figure 10:
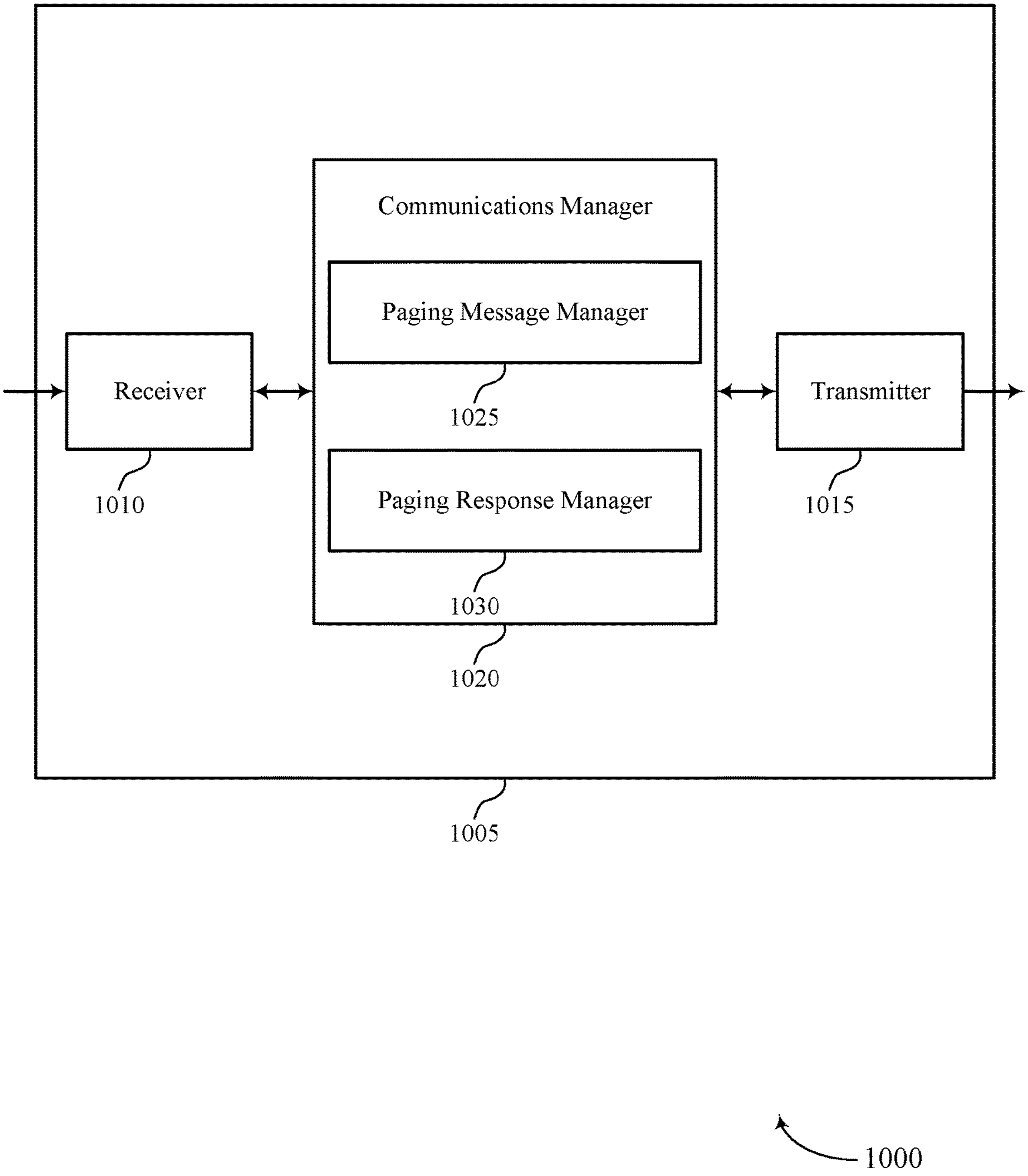

FIG. 10 shows a block diagram 1000 of a device 1005 that supports service-based paging techniques in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to service-based paging techniques). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to service-based paging techniques). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of service-based paging techniques as described herein. For example, the communications manager 1020 may include a paging message manager 1025 a paging response manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The paging message manager 1025 may be configured as or otherwise support a means for transmitting a paging message to a UE, the paging message transmitted on an access stratum layer and including an indication of a service that caused the paging message. The paging response manager 1030 may be configured as or otherwise support a means for monitoring for a paging response from the UE based on the indication of the service that caused the paging message and a non-access stratum layer configuration of the UE. The paging response manager 1030 may be configured as or otherwise support a means for determining one or more subsequent actions for communications with the UE based on the monitoring for the paging response.

Figure 11:
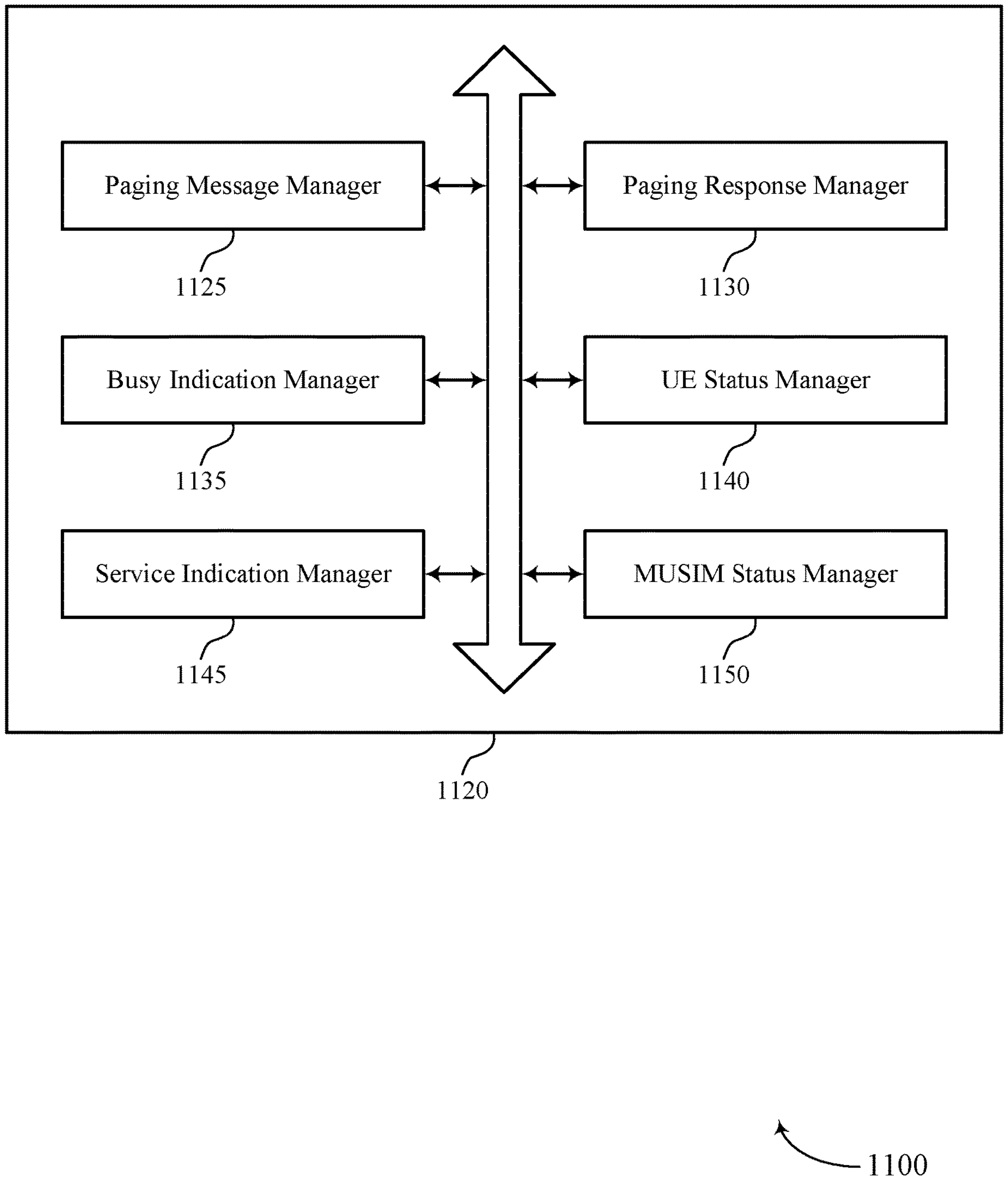
FIG. 11 shows a block diagram of a communications manager that supports service-based paging techniques in accordance with aspects of the present disclosure.

FIG. 11 shows a block diagram 1100 of a communications manager 1120 that supports service-based paging techniques in accordance with aspects of the present disclosure. The communications manager 1120 may be an example of aspects of a communications manager 920, a communications manager 1020, or both, as described herein. The communications manager 1120, or various components thereof, may be an example of means for performing various aspects of service-based paging techniques as described herein. For example, the communications manager 1120 may include a paging message manager 1125, a paging response manager 1130, a busy indication manager 1135, a UE status manager 1140, a service indication manager 1145, a MUSIM status manager 1150, or any combination thereof. Each of these components may communicate, directly or indirectly, with one another (e.g., via one or more buses).

The communications manager 1120 may support wireless communications at a base station in accordance with examples as disclosed herein. The paging message manager 1125 may be configured as or otherwise support a means for transmitting a paging message to a UE, the paging message transmitted on an access stratum layer and including an indication of a service that caused the paging message. The paging response manager 1130 may be configured as or otherwise support a means for monitoring for a paging response from the UE based on the indication of the service that caused the paging message and a non-access stratum layer configuration of the UE. In some examples, the paging response manager 1130 may be configured as or otherwise support a means for determining one or more subsequent actions for communications with the UE based on the monitoring for the paging response.

In some examples, the monitoring for the paging response is based on one or more of a type or capability of the UE, a multiple universal subscriber identity module (MUSIM) status of the UE, an idle or active state of the UE, a network configuration of the UE, a data network name (DNN) or network slice associated with the paging message, or any combinations thereof. In some examples, the paging response includes a busy indication. In some examples, the paging response further includes a time interval. In some examples, deferring a retransmission of the paging message, responsive to the busy indication provided in the paging response, until after the time interval.

In some examples, starting a timer having a value of the time interval. In some examples, declaring the UE temporarily unreachable. In some examples, declaring the UE reachable when the timer expires. In some examples, declaring the UE unreachable when the paging response is not received within a defined time period after transmitting the paging message.

In some examples, the paging message includes an explicit indication of the service that caused the paging message. In some examples, the paging message includes an identification that is associated with the paging message, the identification corresponding to the service that caused the paging message. In some examples, the UE includes a first universal subscriber identity module (USIM) and a second USIM, and where the one or more subsequent actions for communications with the UE are determined based on a presence of an active connection of the first USIM when the paging message is associated with the second USIM.

Figure 12:
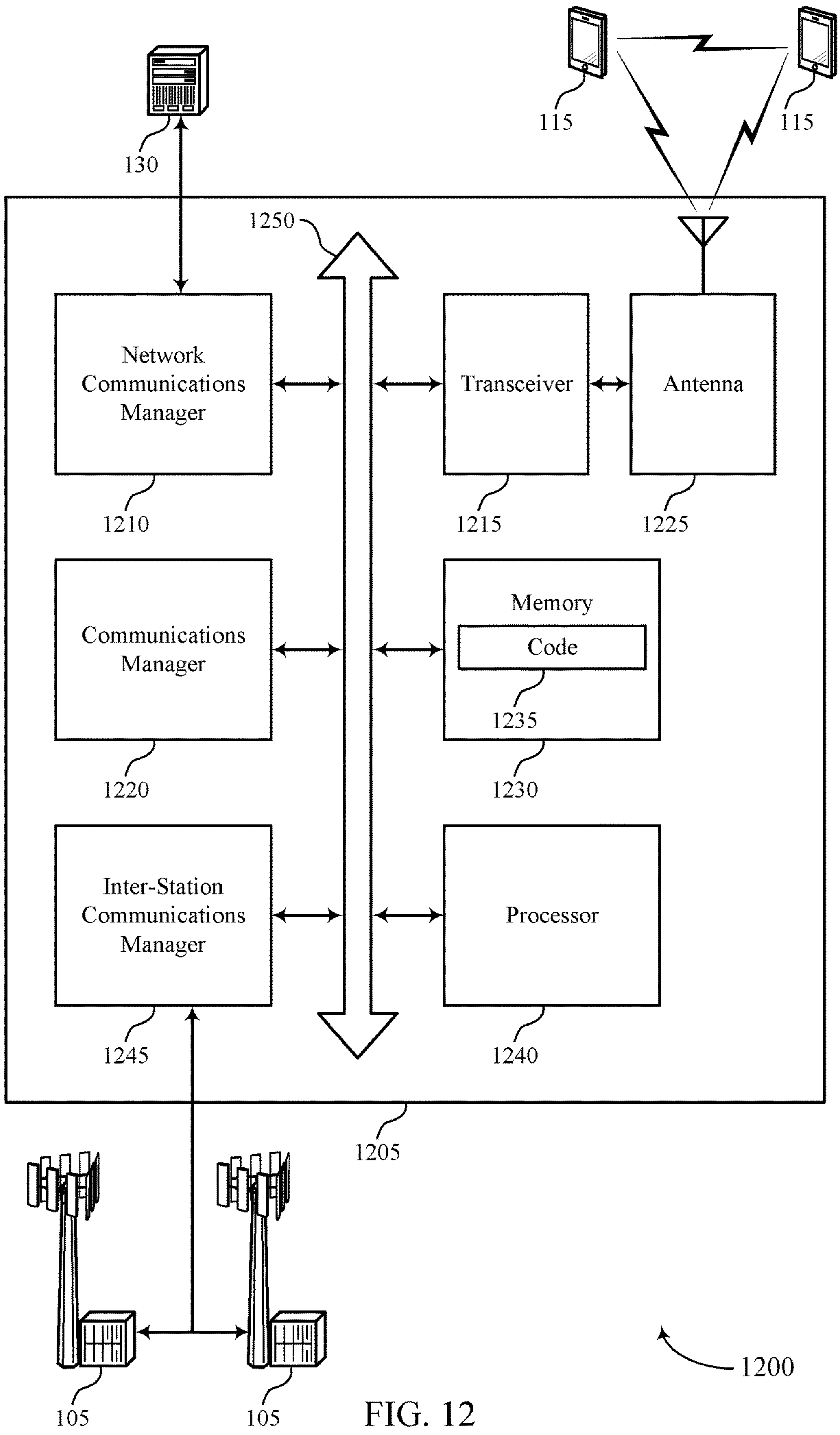
FIG. 12 shows a diagram of a system including a device that supports service-based paging techniques in accordance with aspects of the present disclosure.

FIG. 12 shows a diagram of a system 1200 including a device 1205 that supports service-based paging techniques in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting service-based paging techniques). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting a paging message to a UE, the paging message transmitted on an access stratum layer and including an indication of a service that caused the paging message. The communications manager 1220 may be configured as or otherwise support a means for monitoring for a paging response from the UE based on the indication of the service that caused the paging message and a non-access stratum layer configuration of the UE. The communications manager 1220 may be configured as or otherwise support a means for determining one or more subsequent actions for communications with the UE based on the monitoring for the paging response.

By including or configuring the communications manager 1220 in accordance with examples as described herein, the device 1205 may support techniques for service-based paging responses that may provide for efficient paging responses based on the service that caused the page and a device status, which may result in reduced processing and reduced power consumption, more efficient utilization of communication resources, improved user experience related to reduced service interruptions, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of service-based paging techniques as described herein, or the processor 1240 and the memory 1230 may be otherwise configured to perform or support such operations.

Figure 13:
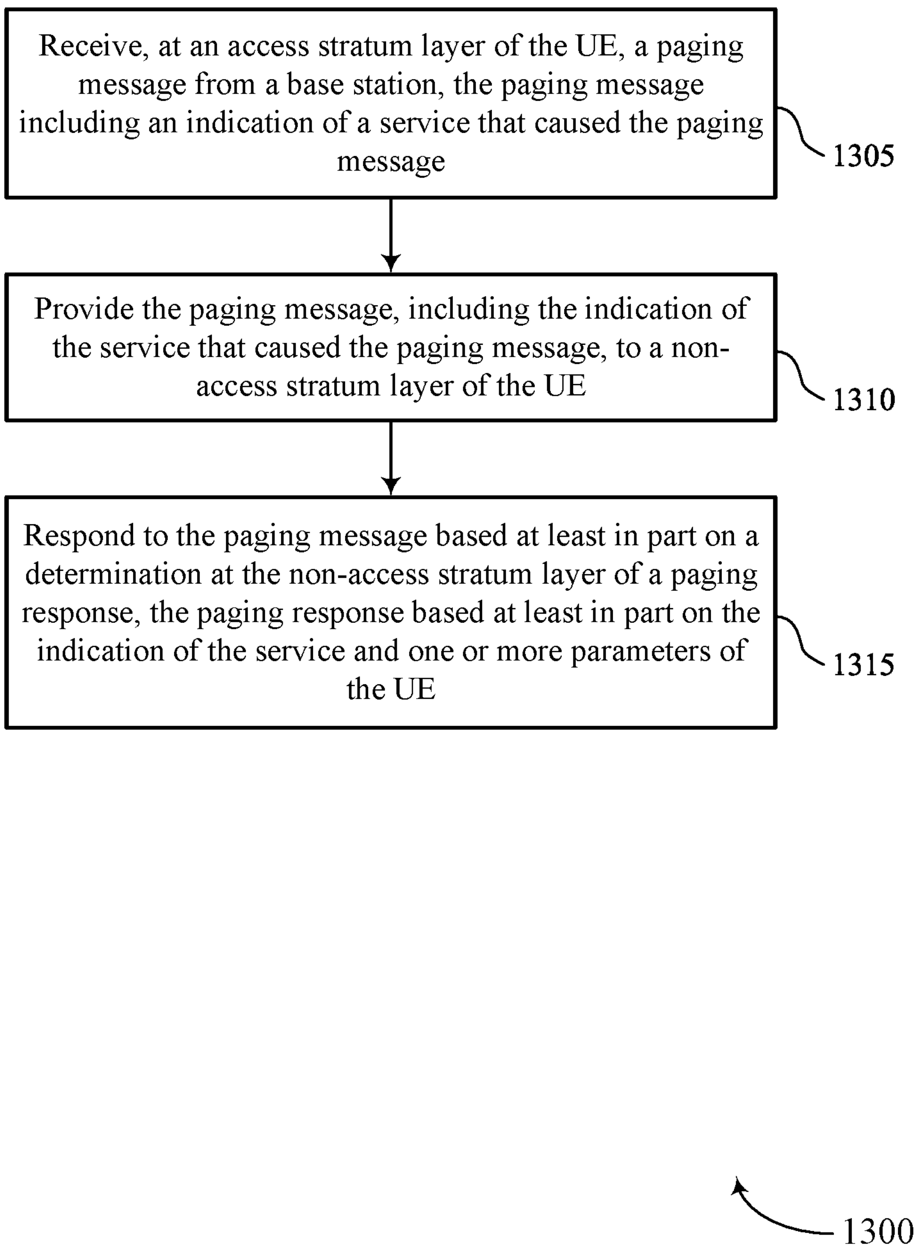
FIGS. 13 through 18 show flowcharts illustrating methods that support service-based paging techniques in accordance with aspects of the present disclosure.

FIG. 13 shows a flowchart illustrating a method 1300 that supports service-based paging techniques in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, at an access stratum layer of the UE, a paging message from a base station, the paging message including an indication of a service that caused the paging message. The operations of 1305 may be performed in accordance with examples as disclosed herein. In some examples, aspects of the operations of 1305 may be performed by a paging message manager 725 as described with reference to FIG. 7.

At 1310, the method may include providing the paging message, including the indication of the service that caused the paging message, to a non-access stratum layer of the UE. The operations of 1310 may be performed in accordance with examples as disclosed herein. In some examples, aspects of the operations of 1310 may be performed by a service indication manager 730 as described with reference to FIG. 7.

At 1315, the method may include responding to the paging message based on a determination at the non-access stratum layer of a paging response, the paging response based on the indication of the service and one or more parameters of the UE. The operations of 1315 may be performed in accordance with examples as disclosed herein. In some examples, aspects of the operations of 1315 may be performed by a paging response manager 735 as described with reference to FIG. 7.

Figure 14:
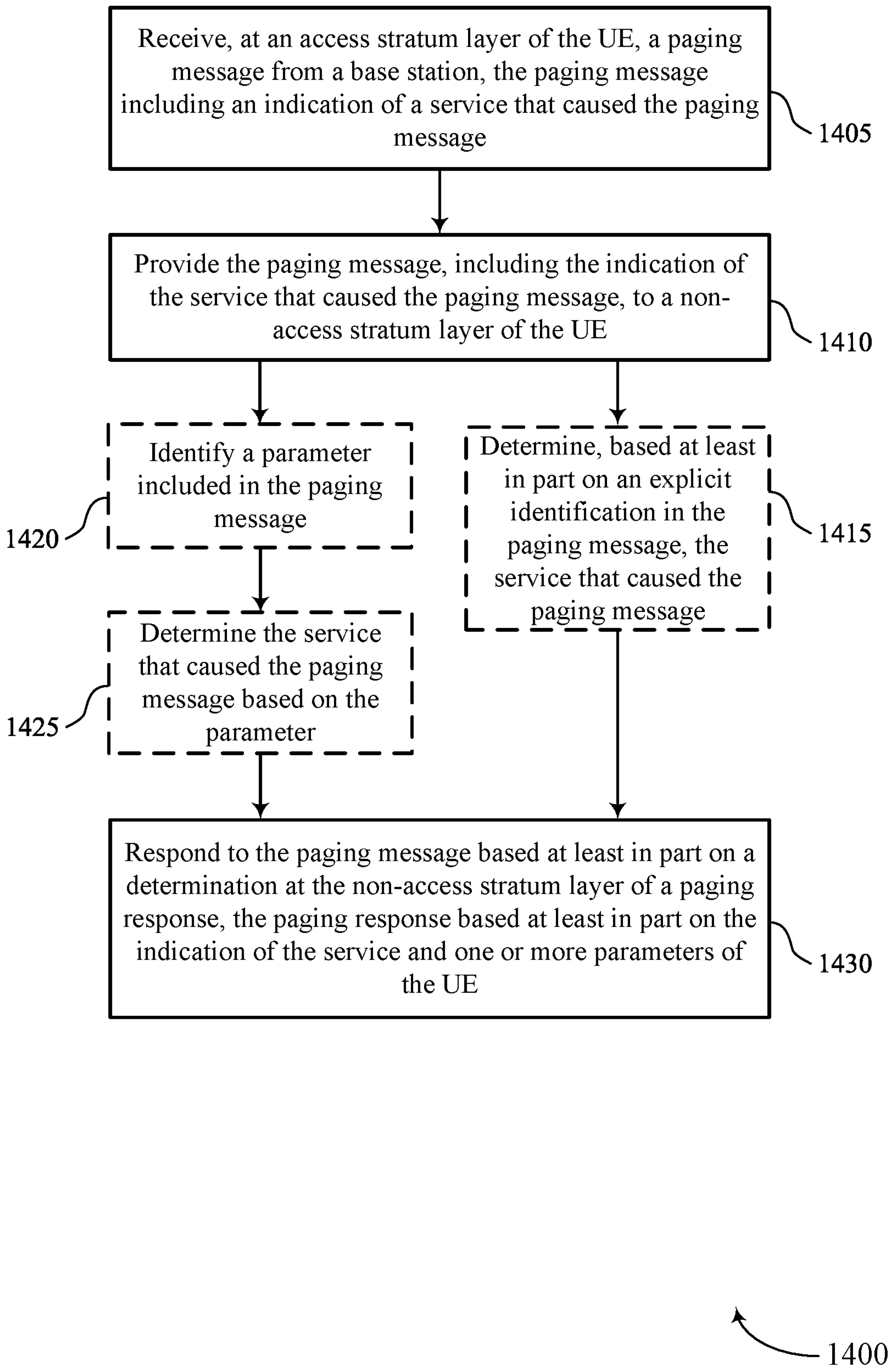

FIG. 14 shows a flowchart illustrating a method 1400 that supports service-based paging techniques in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, at an access stratum layer of the UE, a paging message from a base station, the paging message including an indication of a service that caused the paging message. The operations of 1405 may be performed in accordance with examples as disclosed herein. In some examples, aspects of the operations of 1405 may be performed by a paging message manager 725 as described with reference to FIG. 7.

At 1410, the method may include providing the paging message, including the indication of the service that caused the paging message, to a non-access stratum layer of the UE. The operations of 1410 may be performed in accordance with examples as disclosed herein. In some examples, aspects of the operations of 1410 may be performed by a service indication manager 730 as described with reference to FIG. 7.

Optionally, at 1415, the method may include determining, based on an explicit identification associated with the paging message, the service that caused the paging message. The operations of 1415 may be performed in accordance with examples as disclosed herein. In some examples, aspects of the operations of 1415 may be performed by a service indication manager 730 as described with reference to FIG. 7.

Alternatively, at 1420, the method may include identifying a parameter included in the paging message. In some cases, the parameter may be an identification associate with a service or a network slice. The operations of 1420 may be performed in accordance with examples as disclosed herein. In some examples, aspects of the operations of 1420 may be performed by a service indication manager 730 as described with reference to FIG. 7.

In cases where the UE identifies the parameter associated included in the paging message, at 1425, the method may include determining the service that caused the paging message based on the parameter. The operations of 1425 may be performed in accordance with examples as disclosed herein. In some examples, aspects of the operations of 1425 may be performed by a service indication manager 730 as described with reference to FIG. 7.

At 1430, the method may include responding to the paging message based on a determination at the non-access stratum layer of a paging response, the paging response based on the indication of the service and one or more parameters of the UE. The operations of 1430 may be performed in accordance with examples as disclosed herein. In some examples, aspects of the operations of 1430 may be performed by a paging response manager 735 as described with reference to FIG. 7.

Figure 15:
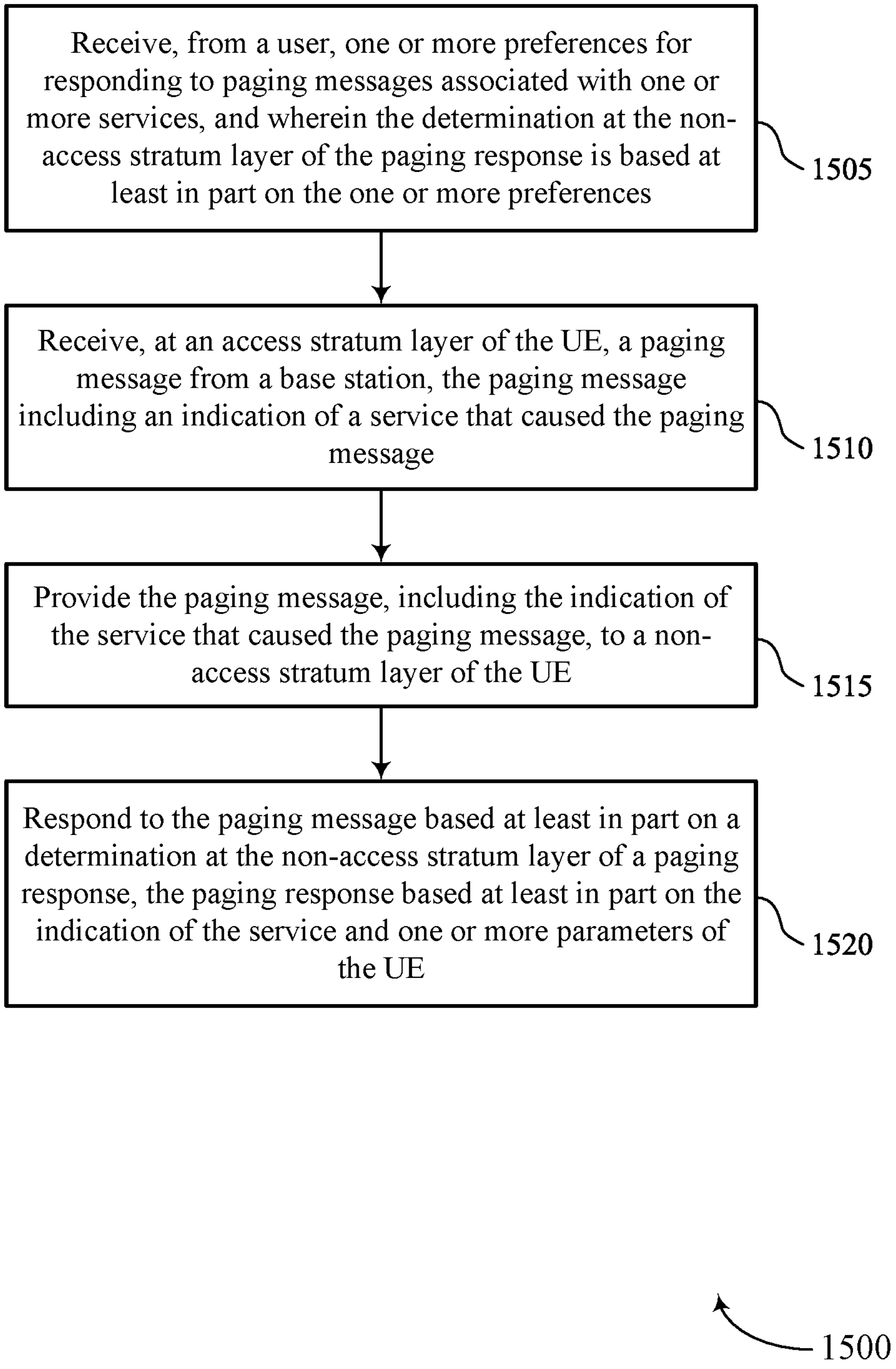

FIG. 15 shows a flowchart illustrating a method 1500 that supports service-based paging techniques in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a user, one or more preferences for responding to paging messages associated with one or more services, and where the determination at the non-access stratum layer of the paging response is based on the one or more preferences. The operations of 1505 may be performed in accordance with examples as disclosed herein. In some examples, aspects of the operations of 1505 may be performed by a user preference manager 740 as described with reference to FIG. 7.

At 1510, the method may include receiving, at an access stratum layer of the UE, a paging message from a base station, the paging message including an indication of a service that caused the paging message. The operations of 1510 may be performed in accordance with examples as disclosed herein. In some examples, aspects of the operations of 1510 may be performed by a paging message manager 725 as described with reference to FIG. 7.

At 1515, the method may include providing the paging message, including the indication of the service that caused the paging message, to a non-access stratum layer of the UE. The operations of 1515 may be performed in accordance with examples as disclosed herein. In some examples, aspects of the operations of 1515 may be performed by a service indication manager 730 as described with reference to FIG. 7.

At 1520, the method may include responding to the paging message based on a determination at the non-access stratum layer of a paging response, the paging response based on the indication of the service and one or more parameters of the UE. The operations of 1520 may be performed in accordance with examples as disclosed herein. In some examples, aspects of the operations of 1520 may be performed by a paging response manager 735 as described with reference to FIG. 7.

Figure 16:
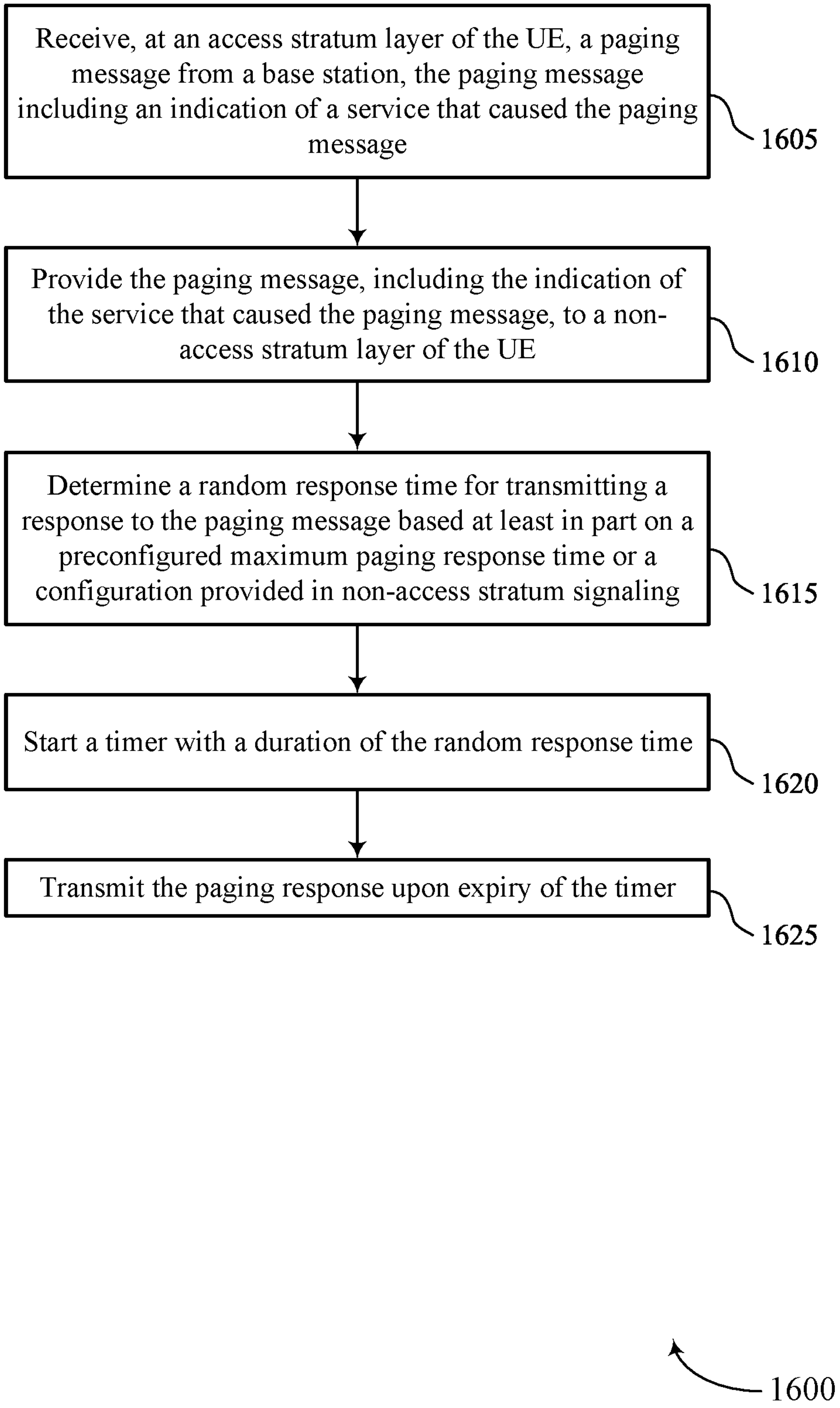

FIG. 16 shows a flowchart illustrating a method 1600 that supports service-based paging techniques in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, at an access stratum layer of the UE, a paging message from a base station, the paging message including an indication of a service that caused the paging message. The operations of 1605 may be performed in accordance with examples as disclosed herein. In some examples, aspects of the operations of 1605 may be performed by a paging message manager 725 as described with reference to FIG. 7.

At 1610, the method may include providing the paging message, including the indication of the service that caused the paging message, to a non-access stratum layer of the UE. The operations of 1610 may be performed in accordance with examples as disclosed herein. In some examples, aspects of the operations of 1610 may be performed by a service indication manager 730 as described with reference to FIG. 7.

At 1615, the method may include determining a random response time for transmitting a response to the paging message based on a preconfigured maximum paging response time or a configuration provided in non-access stratum signaling. The operations of 1615 may be performed in accordance with examples as disclosed herein. In some examples, aspects of the operations of 1615 may be performed by a random delay manager 745 as described with reference to FIG. 7.

At 1620, the method may include starting a timer with a duration of the random response time. The operations of 1620 may be performed in accordance with examples as disclosed herein. In some examples, aspects of the operations of 1620 may be performed by a random delay manager 745 as described with reference to FIG. 7.

At 1625, the method may include transmitting the paging response upon expiry of the timer. The operations of 1625 may be performed in accordance with examples as disclosed herein. In some examples, aspects of the operations of 1625 may be performed by a random delay manager 745 as described with reference to FIG. 7.

Figure 17:
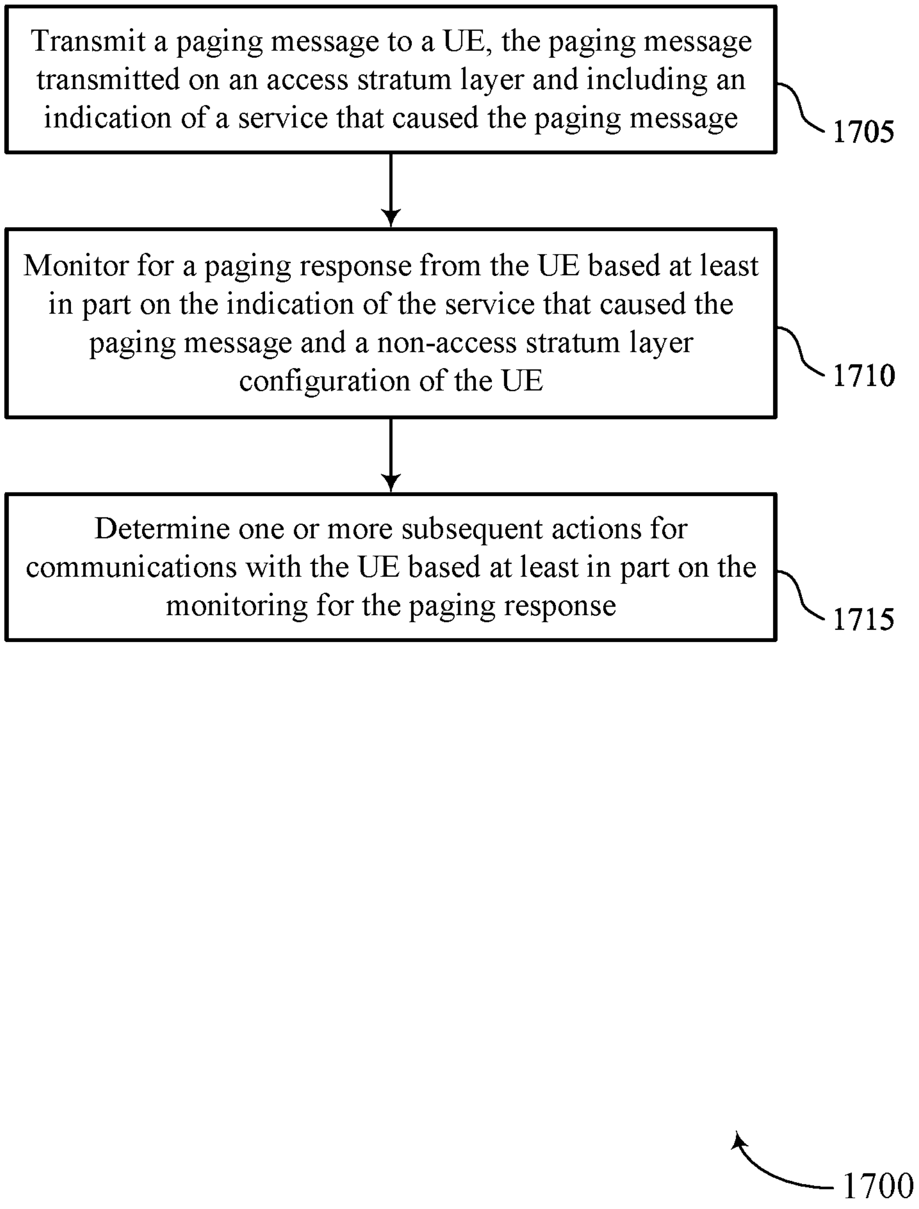

FIG. 17 shows a flowchart illustrating a method 1700 that supports service-based paging techniques in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting a paging message to a UE, the paging message transmitted on an access stratum layer and including an indication of a service that caused the paging message. The operations of 1705 may be performed in accordance with examples as disclosed herein. In some examples, aspects of the operations of 1705 may be performed by a paging message manager 1125 as described with reference to FIG. 11.

At 1710, the method may include monitoring for a paging response from the UE based on the indication of the service that caused the paging message and a non-access stratum layer configuration of the UE. The operations of 1710 may be performed in accordance with examples as disclosed herein. In some examples, aspects of the operations of 1710 may be performed by a paging response manager 1130 as described with reference to FIG. 11.

At 1715, the method may include determining one or more subsequent actions for communications with the UE based on the monitoring for the paging response. The operations of 1715 may be performed in accordance with examples as disclosed herein. In some examples, aspects of the operations of 1715 may be performed by a paging response manager 1130 as described with reference to FIG. 11.

Figure 18:
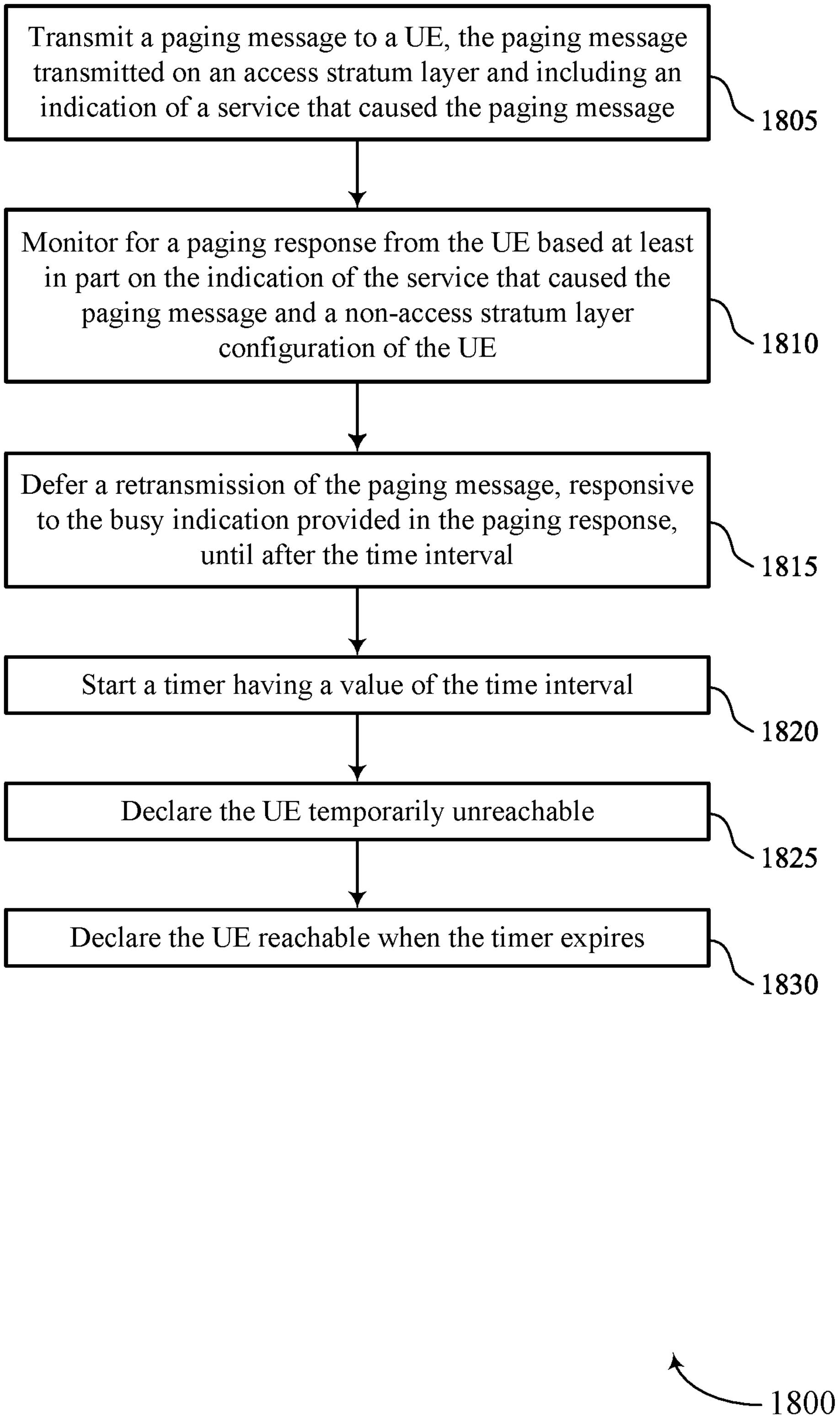

FIG. 18 shows a flowchart illustrating a method 1800 that supports service-based paging techniques in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting a paging message to a UE, the paging message transmitted on an access stratum layer and including an indication of a service that caused the paging message. The operations of 1805 may be performed in accordance with examples as disclosed herein. In some examples, aspects of the operations of 1805 may be performed by a paging message manager 1125 as described with reference to FIG. 11.

At 1810, the method may include monitoring for a paging response from the UE based on the indication of the service that caused the paging message and a non-access stratum layer configuration of the UE. The operations of 1810 may be performed in accordance with examples as disclosed herein. In some examples, aspects of the operations of 1810 may be performed by a paging response manager 1130 as described with reference to FIG. 11. In some cases, the paging response includes a busy indication, and may also include a time interval.

At 1815, the method may include deferring a retransmission of the paging message, responsive to the busy indication provided in the paging response, until after the time interval. The operations of 1815 may be performed in accordance with examples as disclosed herein. In some examples, aspects of the operations of 1815 may be performed by a busy indication manager 1135 as described with reference to FIG. 11.

At 1820, the method may include starting a timer having a value of the time interval. The operations of 1820 may be performed in accordance with examples as disclosed herein. In some examples, aspects of the operations of 1820 may be performed by a busy indication manager 1135 as described with reference to FIG. 11.

At 1825, the method may include declaring the UE temporarily unreachable. The operations of 1825 may be performed in accordance with examples as disclosed herein. In some examples, aspects of the operations of 1825 may be performed by a UE status manager 1140 as described with reference to FIG. 11.

At 1830, the method may include declaring the UE reachable when the timer expires. The operations of 1830 may be performed in accordance with examples as disclosed herein. In some examples, aspects of the operations of 1830 may be performed by a UE status manager 1140 as described with reference to FIG. 11.

The following provides an overview of aspects of the present disclosure:

Aspect 1: A method for wireless communications at a UE, comprising: receiving, at an access stratum layer of the UE, a paging message from a base station, the paging message including an indication of a service that caused the paging message; providing the paging message, including the indication of the service that caused the paging message, to a non-access stratum layer of the UE; and responding to the paging message based at least in part on a determination at the non-access stratum layer of a paging response, the paging response based at least in part on the indication of the service and one or more parameters of the UE.

Aspect 2: The method of aspect 1, wherein the paging response is determined based at least in part on one or more of a type or capability of the UE, a multiple universal subscriber identity module (MUSIM) status of the UE, an idle or active state of the UE, a user preference provided to the UE, a network configuration of the UE, a data network name (DNN) or network slice associated with the paging message, or any combinations thereof.

Aspect 3: The method of any of aspects 1 through 2, wherein the paging response includes ignoring the paging message, responding to the paging message according to a baseline paging response, responding to the paging message with a busy indication, or responding to the paging message after an expiration of a delay time period.

Aspect 4: The method of any of aspects 1 through 3, wherein the paging message includes an explicit indication of the service that caused the paging message.

Aspect 5: The method of any of aspects 1 through 4, further comprising: determining, based at least in part on an identification associated with the paging message, the service that caused the paging message.

Aspect 6: The method of any of aspects 1 through 4, further comprising: determining, based at least in part on a parameter included in the paging message, the service that caused the paging message.

Aspect 7: The method of aspect 6, wherein the parameter included in the paging message is an identity associated with the service.

Aspect 8: The method of any of aspects 1 through 7, further comprising: receiving, from a user, one or more preferences for responding to paging messages associated with one or more services, and wherein the determination at the non-access stratum layer of the paging response is based at least in part on the one or more preferences.

Aspect 9: The method of any of aspects 1 through 8, further comprising: determining a random response time for transmitting a response to the paging message based at least in part on a preconfigured maximum paging response time or a configuration provided in non-access stratum signaling; starting a timer with a duration of the random response time; and transmitting the paging response upon expiry of the timer.

Aspect 10: The method of any of aspects 1 through 9, wherein the UE includes a first universal subscriber identity module (USIM) and a second USIM, and wherein the paging response is determined based at least in part on a presence of an active connection of the first USIM when the paging message is associated with the second USIM.

Aspect 11: The method of any of aspects 1 through 8, wherein the paging response is to ignore the paging message.

Aspect 12: The method of any of aspects 1 through 8, wherein the paging response is a busy indication.

Aspect 13: The method of aspect 12, wherein the busy indication includes a time interval for a busy state at the UE.

Aspect 14: The method of aspect 13, wherein the time interval for the busy state indicates to the base station that further paging messages are to be delayed until an expiration of the time interval, and wherein the UE is not declared UE unreachable, or is declared temporarily unreachable for the service, until the expiration of the time interval.

Aspect 15: The method of any of aspects 1 through 8, wherein the paging response includes a service request message or registration request message that is transmitted after expiration of a random delay interval.

Aspect 16: The method of aspect 15, wherein a maximum duration of the random delay interval is based at least in part on a type of service associate with the paging message, a configured maximum duration, or any combinations thereof.

Aspect 17: A method for wireless communications at a base station, comprising: transmitting a paging message to a UE, the paging message transmitted on an access stratum layer and including an indication of a service that caused the paging message; monitoring for a paging response from the UE based at least in part on the indication of the service that caused the paging message and a non-access stratum layer configuration of the UE; and determining one or more subsequent actions for communications with the UE based at least in part on the monitoring for the paging response.

Aspect 18: The method of aspect 17, wherein the monitoring for the paging response is based at least in part on one or more of a type or capability of the UE, a multiple universal subscriber identity module (MUSIM) status of the UE, an idle or active state of the UE, a network configuration of the UE, a data network name (DNN) or network slice associated with the paging message, or any combinations thereof.

Aspect 19: The method of any of aspects 17 through 18, wherein the paging response includes a busy indication.

Aspect 20: The method of aspect 19, wherein the paging response further includes a time interval.

Aspect 21: The method of aspect 20, wherein the one or more subsequent actions for communications with the UE include deferring a retransmission of the paging message, responsive to the busy indication provided in the paging response, until after the time interval.

Aspect 22: The method of any of aspects 20 through 21, wherein the one or more subsequent actions for communications with the UE include starting a timer having a value of the time interval; declaring the UE temporarily unreachable; and declaring the UE reachable when the timer expires.

Aspect 23: The method of any of aspects 17 through 22, wherein the one or more subsequent actions for communications with the UE include declaring the UE unreachable when the paging response is not received within a defined time period after transmitting the paging message.

Aspect 24: The method of any of aspects 17 through 23, wherein the paging message includes an explicit indication of the service that caused the paging message.

Aspect 25: The method of any of aspects 17 through 23, wherein the paging message includes an identification that is associated with the paging message, the identification corresponding to the service that caused the paging message.

Aspect 26: The method of any of aspects 17 through 25, wherein the UE includes a first universal subscriber identity module (USIM) and a second USIM, and wherein the one or more subsequent actions for communications with the UE are determined based at least in part on a presence of an active connection of the first USIM when the paging message is associated with the second USIM.

Aspect 27: An apparatus for wireless communications at a UE, comprising a processor; memory coupled with the processor; and instructions stored in the memory and executable by the processor to cause the apparatus to perform a method of any of aspects 1 through 16.

Aspect 28: An apparatus for wireless communications at a UE, comprising at least one means for performing a method of any of aspects 1 through 16.

Aspect 29: A non-transitory computer-readable medium storing code for wireless communications at a UE, the code comprising instructions executable by a processor to perform a method of any of aspects 1 through 16.

Aspect 30: An apparatus for wireless communications at a base station, comprising a processor; memory coupled with the processor; and instructions stored in the memory and executable by the processor to cause the apparatus to perform a method of any of aspects 17 through 26.

Aspect 31: An apparatus for wireless communications at a base station, comprising at least one means for performing a method of any of aspects 17 through 26.

Aspect 32: A non-transitory computer-readable medium storing code for wireless communications at a base station, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment (UE), comprising:
  - monitoring, in an inactive or idle state of the UE, a paging channel for a paging message indicating that the UE has a forthcoming data message and is to transition to an active state to receive the data message;
  - receiving, via the paging channel and at an access stratum layer of the UE while in the inactive or idle state of the UE, the paging message, the paging message including a multicast/broadcast service (MBS) identifier of an MBS based at least in part on an implicit indication in the paging message that a cause of the paging message is the MBS;
  - providing, while in the inactive or idle state of the UE, an indication of the MBS that caused the paging message included in the paging message to a non-access stratum layer of the UE; and
  - responding to the paging message based at least in part on a determination at the non-access stratum layer of a paging response to the paging message, wherein the paging response is based at least in part on the indication of the cause of the paging message, a multiple universal subscriber identity module (MUSIM) status of the UE, and one or more parameters of the UE.

2. The method of claim 1, wherein the paging response includes ignoring the paging message, responding to the paging message according to a baseline paging response, responding to the paging message with a busy indication, or responding to the paging message after an expiration of a delay time period.

3. The method of claim 1, wherein the paging message includes an indication of a data network name (DNN) or a network slice associated with the MBS that caused the paging message.

4. The method of claim 1, further comprising:
  - receiving, from a user, one or more preferences for responding to paging messages associated with one or more services, and wherein the determination at the non-access stratum layer of the paging response is based at least in part on the one or more preferences.

5. The method of claim 1, further comprising:
  - determining a random response time for transmitting a response to the paging message based at least in part on a preconfigured maximum paging response time or a configuration provided in non-access stratum signaling;
  - starting a timer with a duration of the random response time; and
  - transmitting the paging response upon expiry of the timer.

6. The method of claim 1, wherein the UE includes a first universal subscriber identity module (USIM) and a second USIM, and wherein the paging response is based at least in part on a presence of an active connection of the first USIM when the paging message is associated with the second USIM.

7. The method of claim 1, wherein the paging response is to ignore the paging message.

8. The method of claim 1, wherein the paging response is a busy indication.

9. The method of claim 8, wherein the busy indication includes a time interval for a busy state at the UE.

10. The method of claim 9, wherein the time interval for the busy state indicates that further paging messages are to be delayed until an expiration of the time interval, and wherein the UE is not declared unreachable, or is declared temporarily unreachable for the MBS, until the expiration of the time interval.

11. The method of claim 1, wherein the paging response includes a service request message or registration request message that is transmitted after expiration of a random delay interval.

12. The method of claim 11, wherein a maximum duration of the random delay interval is based at least in part on a type of service associated with the paging message, a configured maximum duration, or any combinations thereof.

13. A user equipment (UE) for wireless communications, comprising:
  - one or more processors; and
  - one or more memories coupled with the one or more processors and storing processor-executable code that, when executed by the one or more processors, causes the UE to:
    - monitor, in an inactive or idle state of the UE, a paging channel for a paging message indicating that the UE has a forthcoming data message and is to transition to an active state to receive the data message;
    - receive, via the paging channel and at an access stratum layer of the UE while in the inactive or idle state of the UE, the paging message, the paging message including a multicast/broadcast service (MBS) identifier of an MBS based at least in part on an implicit indication in the paging message that a cause of the paging message is the MBS;
    - provide, while in the inactive or idle state of the UE, an indication of the MBS that caused the paging message included in the paging message to a non-access stratum layer of the UE; and respond to the paging message based at least in part on a determination at the non-access stratum layer of a paging response to the paging message, wherein the paging response is based at least in part on the indication of cause of the paging message, a multiple universal subscriber identity module (MUSIM) status of the UE, and one or more parameters of the UE.

14. The UE of claim 13, wherein the paging message includes an indication of a data network name (DNN) or a network slice associated with the MBS that caused the paging message.

15. The UE of claim 13, wherein the paging response includes ignoring the paging message, responding to the paging message according to a baseline paging response, responding to the paging message with a busy indication, or responding to the paging message after an expiration of a delay time period.

16. The UE of claim 13, wherein the code, when executed by the one or more processors, further causes the UE to:

receive, from a user, one or more preferences for responding to paging messages associated with one or more services, and wherein the determination at the non-access stratum layer of the paging response is based at least in part on the one or more preferences.

17. The UE of claim 13, wherein the code, when executed by the one or more processors, further causes the UE to:

determine a random response time for transmission of a response to the paging message based at least in part on a preconfigured maximum paging response time or a configuration provided in non-access stratum signaling;

start a timer with a duration of the random response time; and transmit the paging response upon expiry of the timer.

18. The UE of claim 13, wherein the UE includes a first universal subscriber identity module (USIM) and a second USIM, and wherein the paging response is based at least in part on a presence of an active connection of the first USIM when the paging message is associated with the second USIM.

19. The UE of claim 13, wherein the paging response is to ignore the paging message.

20. The UE of claim 13, wherein the paging response is a busy indication.

21. The UE of claim 20, wherein the busy indication includes a time interval for a busy state at the UE.

22. The UE of claim 21, wherein the time interval for the busy state indicates that further paging messages are to be delayed until an expiration of the time interval, and wherein the UE is not declared unreachable, or is declared temporarily unreachable for the MBS, until the expiration of the time interval.

23. The UE of claim 13, wherein the paging response includes a service request message or registration request message that is transmitted after expiration of a random delay interval.

24. The UE of claim 23, wherein a maximum duration of the random delay interval is based at least in part on a type of service associated with the paging message, a configured maximum duration, or any combinations thereof.

25. The method of claim 1, wherein the paging response is based at least in part on one or more of a type or capability of the UE, an idle or active state of the UE, a user preference provided to the UE, a network configuration of the UE, a data network name (DNN) or network slice associated with the paging message, or any combinations thereof.

26. The UE of claim 13, wherein the paging response is based at least in part on one or more of a type or capability of the UE, an idle or active state of the UE, a user preference provided to the UE, a network configuration of the UE, a data network name (DNN) or network slice associated with the paging message, or any combinations thereof.

* * * * *